US008861104B2

United States Patent
Ito

(10) Patent No.: US 8,861,104 B2
(45) Date of Patent: Oct. 14, 2014

(54) LENS BARREL AND IMAGING DEVICE

(75) Inventor: Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 30 days.

(21) Appl. No.: 13/640,736

(22) PCT Filed: May 31, 2011

(86) PCT No.: PCT/JP2011/003042
§ 371 (c)(1),
(2), (4) Date: Oct. 31, 2012

(87) PCT Pub. No.: WO2012/107966
PCT Pub. Date: Aug. 16, 2012

(65) Prior Publication Data
US 2013/0044381 A1 Feb. 21, 2013

(30) Foreign Application Priority Data

Feb. 9, 2011 (JP) ................................. 2011-026548

(51) Int. Cl.
*G02B 7/02* (2006.01)
*G02B 7/10* (2006.01)

(52) U.S. Cl.
CPC ...................................... *G02B 7/102* (2013.01)
USPC ...................................................... 359/823

(58) Field of Classification Search
USPC ......................................................... 359/823
See application file for complete search history.

(56) References Cited

U.S. PATENT DOCUMENTS

| 5,661,609 | A | 8/1997 | Asakura et al. |
| 5,739,962 | A | 4/1998 | Asakura et al. |
| 6,023,376 | A * | 2/2000 | Nomura et al. ............... 359/694 |
| 6,954,588 | B2 | 10/2005 | Murakami |
| 7,088,916 | B2 | 8/2006 | Nomura |
| 7,103,273 | B2 | 9/2006 | Hosokawa et al. |
| 7,130,132 | B2 | 10/2006 | Lee |
| 7,228,068 | B2 | 6/2007 | Koyama |
| 7,546,029 | B2 | 6/2009 | Ishizuka et al. |
| 7,663,810 | B2 | 2/2010 | Watanabe et al. |
| 7,899,312 | B2 | 3/2011 | Iijima et al. |
| 2009/0033751 | A1 | 2/2009 | Hasuda |

FOREIGN PATENT DOCUMENTS

| JP | H01-277810 A | 11/1989 |
| JP | H05-034563 A | 2/1993 |
| JP | H07-020371 A | 1/1995 |

(Continued)

OTHER PUBLICATIONS

International Search Report of PCT Application No. PCT/JP2011/003042.

(Continued)

*Primary Examiner* — James Jones
(74) *Attorney, Agent, or Firm* — Shinjyu Global IP

(57) ABSTRACT

An interchangeable lens unit comprises a lens housing, a cam frame, and a zoom drive unit. The zoom drive unit is mounted to the lens housing, and rotationally drives the cam frame with respect to the lens housing. The lens housing has a substantially cylindrical main body component and a gear component that is disposed on the inner peripheral face of the main body component and to which the drive force of the zoom drive unit is transmitted. The gear component is disposed substantially in the middle of the main body component in the optical axis direction.

20 Claims, 21 Drawing Sheets

(56) References Cited

FOREIGN PATENT DOCUMENTS

| | | |
|---|---|---|
| JP | H10-115759 A | 5/1998 |
| JP | 2003-344747 A | 12/2003 |
| JP | 2004-151137 A | 5/2004 |
| JP | 2004-258312 A | 9/2004 |
| JP | 2007-093711 A | 4/2007 |
| JP | 2007-212505 A | 8/2007 |
| JP | 2008-176128 A | 7/2008 |
| JP | 2010-266749 A | 11/2010 |

OTHER PUBLICATIONS

International Search Report of co-pending PCT Application No. PCT/JP2011/003039.

Non-final Office Action for the corresponding U.S. Appl. No. 13/443,868, issued Sep. 9, 2013.

* cited by examiner

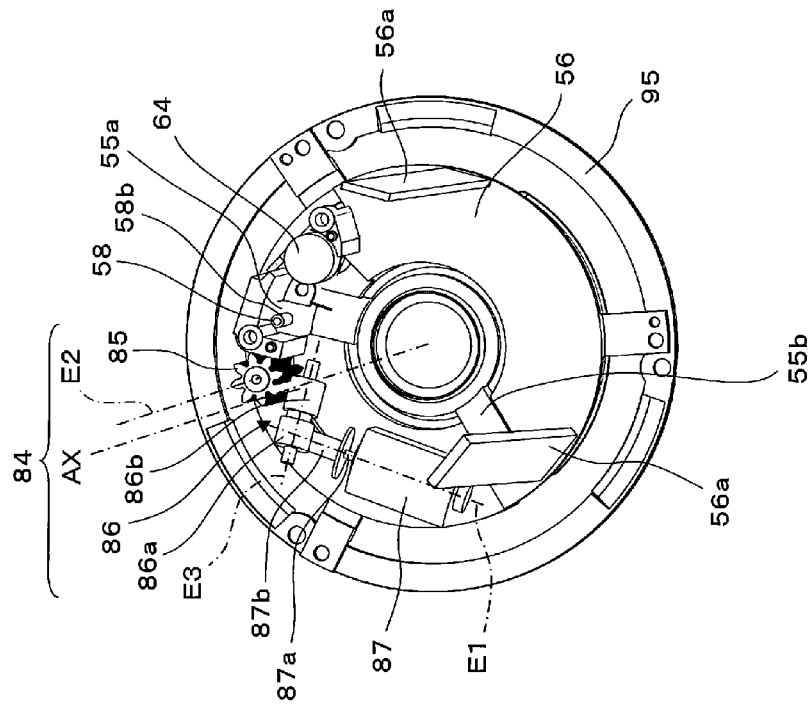
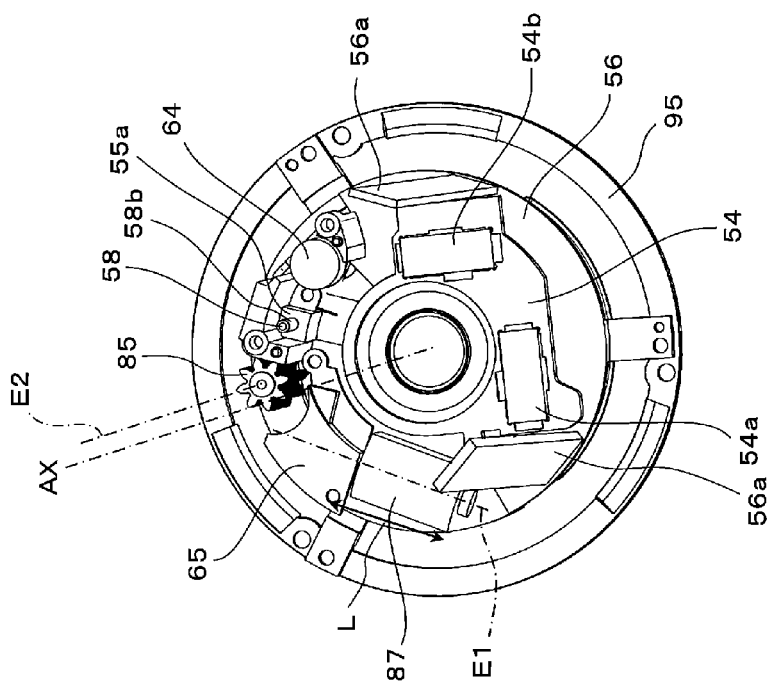
FIG. 12A
FIG. 12B

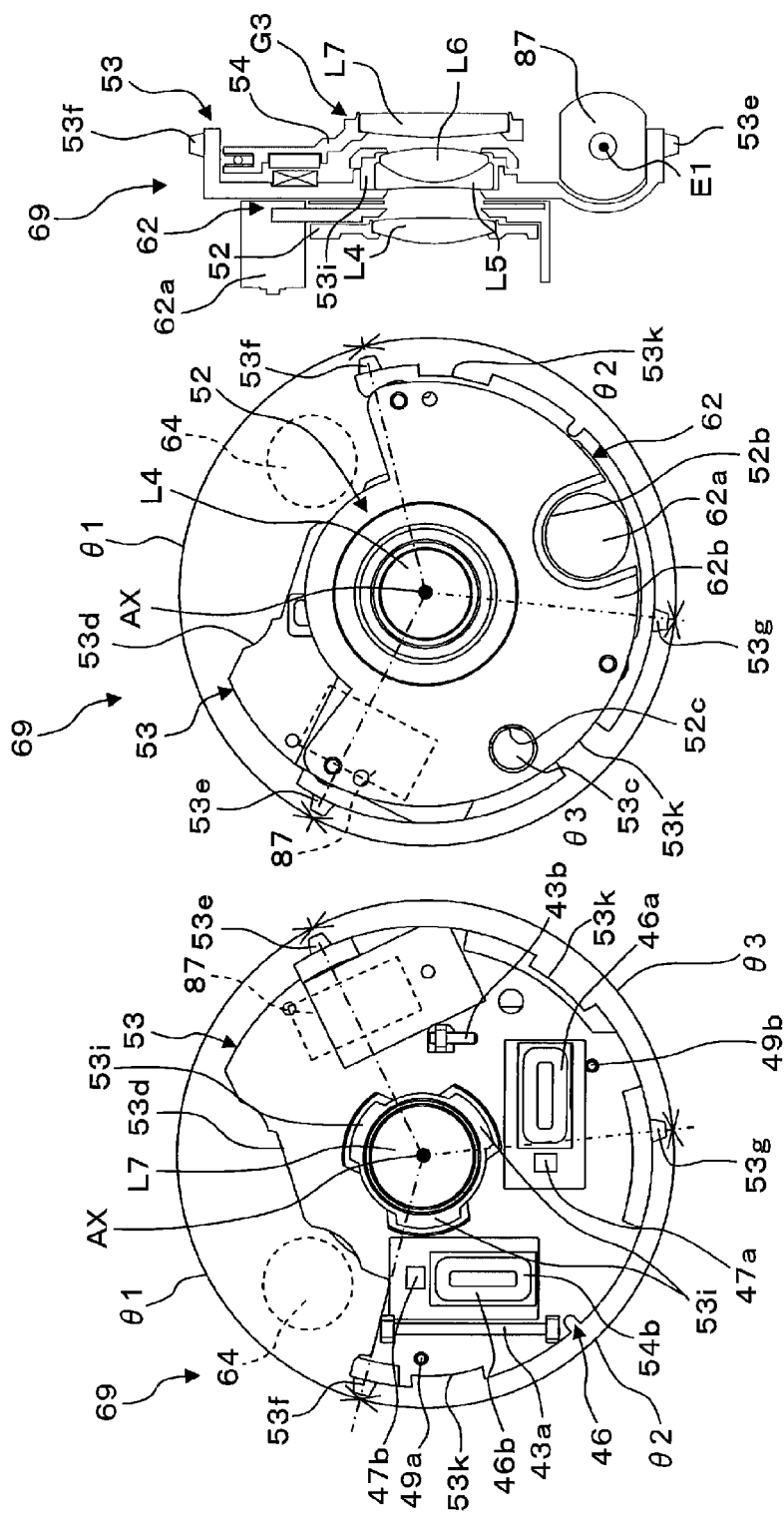

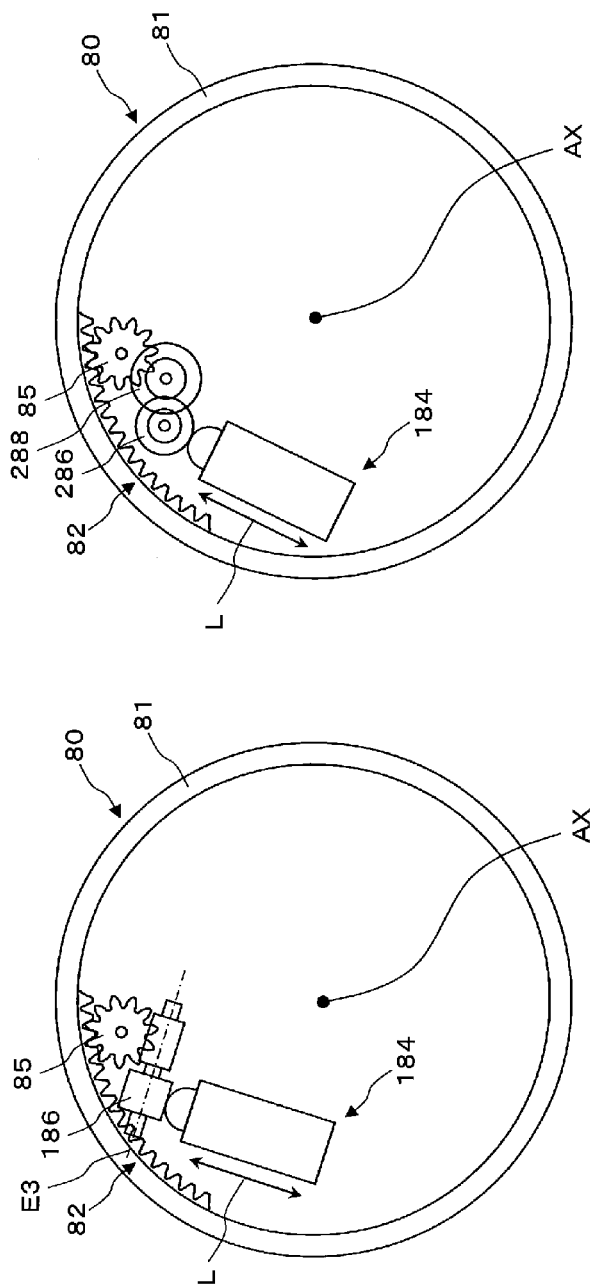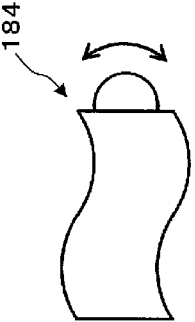

LENS BARREL AND IMAGING DEVICE

BACKGROUND

1. Technical Field

The technology disclosed herein relates to a lens barrel used in an imaging device.

2. Background Information

Imaging devices that produce image data about a subject have been rapidly growing in popularity in recent years. A lens barrel for adjusting the focal distance is installed in an imaging device. Known imaging devices include, for example, integrated types of cameras and those with an interchangeable lens. Integrated cameras have the lens barrel built in. An interchangeable lens camera has a camera body and an interchangeable lens unit that is mountable to and removable from the camera body. For example, the lens barrel in this case is built into the interchangeable lens unit.

SUMMARY

An actuator is built into this type of lens barrel. Examples of actuators include a zoom motor used to adjust the focal distance, and a focus motor used to focus on the desired main subject.

These actuators transmit torque through a gear or other such member to a support frame installed in the lens barrel. This allows the support frame to be rotated, and this rotation may be used to move another frame in the optical axis direction or to rotate it.

However, the actuator is usually disposed near the end of the support frame, so if a gear is formed at the base of the support frame, the actuator and the gear will tend to interfere with each other. Therefore, with a lens barrel having a structure such as this, the layout of the members ends up being less efficient and the product more bulky because of the need to avoid interference between the actuator and the gear.

One object of the technology disclosed herein is to provide a lens barrel and an imaging device that is more compact.

The lens barrel disclosed herein comprises a first frame, a second frame, a moving frame, and a drive actuator. The second frame is rotatably supported by the first frame. The moving frame is guided in the optical axis direction by the second frame. The drive actuator is mounted on the first frame and rotationally drives the second frame with respect to the first frame. The second frame has a substantially cylindrical main body component and a gear component that is disposed on the inner peripheral face of the main body component and to which the drive force of the drive actuator is transmitted. The gear component is disposed substantially in the middle of the main body component in the optical axis direction.

With this lens barrel, since the gear component is disposed substantially in the middle of the main body component in the optical axis direction, a space is formed between the gear component and the first frame in the optical axis direction. This space can be utilized more effectively than when the gear component is formed at the end of the second frame on the first frame side. For example, other members can be disposed in this space, so these members can be disposed more efficiently.

Furthermore, compared to when the gear component is formed on the end of the second frame on the opposite side from the first frame, members of the drive actuator that mesh with the gear component is capable of being smaller in the optical axis direction, and this affords a more compact lens barrel.

A similar reduction in size may be achieved with an imaging device comprising this lens barrel.

BRIEF DESCRIPTION OF DRAWINGS

Referring now to the attached drawings which form a part of this original disclosure:

FIG. 12A is an oblique perspective view of the interchangeable lens unit 2, which is similar to FIG. 11B except that the cam frame 80 and a moving frame 53 have been removed from the state in FIG. 11B, and FIG. 12B is an oblique perspective view of the interchangeable lens unit 2, which is similar to FIG. 12A except that a correction lens frame 54 and a second support cover 65 have been removed from the state in FIG. 12A;

FIG. 16A is a plan view (rear face side) of a second lens support frame 69, FIG. 16B is a plan view (front face side) of the second lens support frame 69, and FIG. 16C is a simplified cross section of the second lens support frame 69;

FIG. 22A is a simplified layout diagram of a piezoelectric actuator 187, FIG. 22B is a diagram illustrating the operation of the piezoelectric actuator 187, and FIG. 22C is a simplified layout diagram of the piezoelectric actuator 187.

DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Overview of Digital Camera

Figure 1:
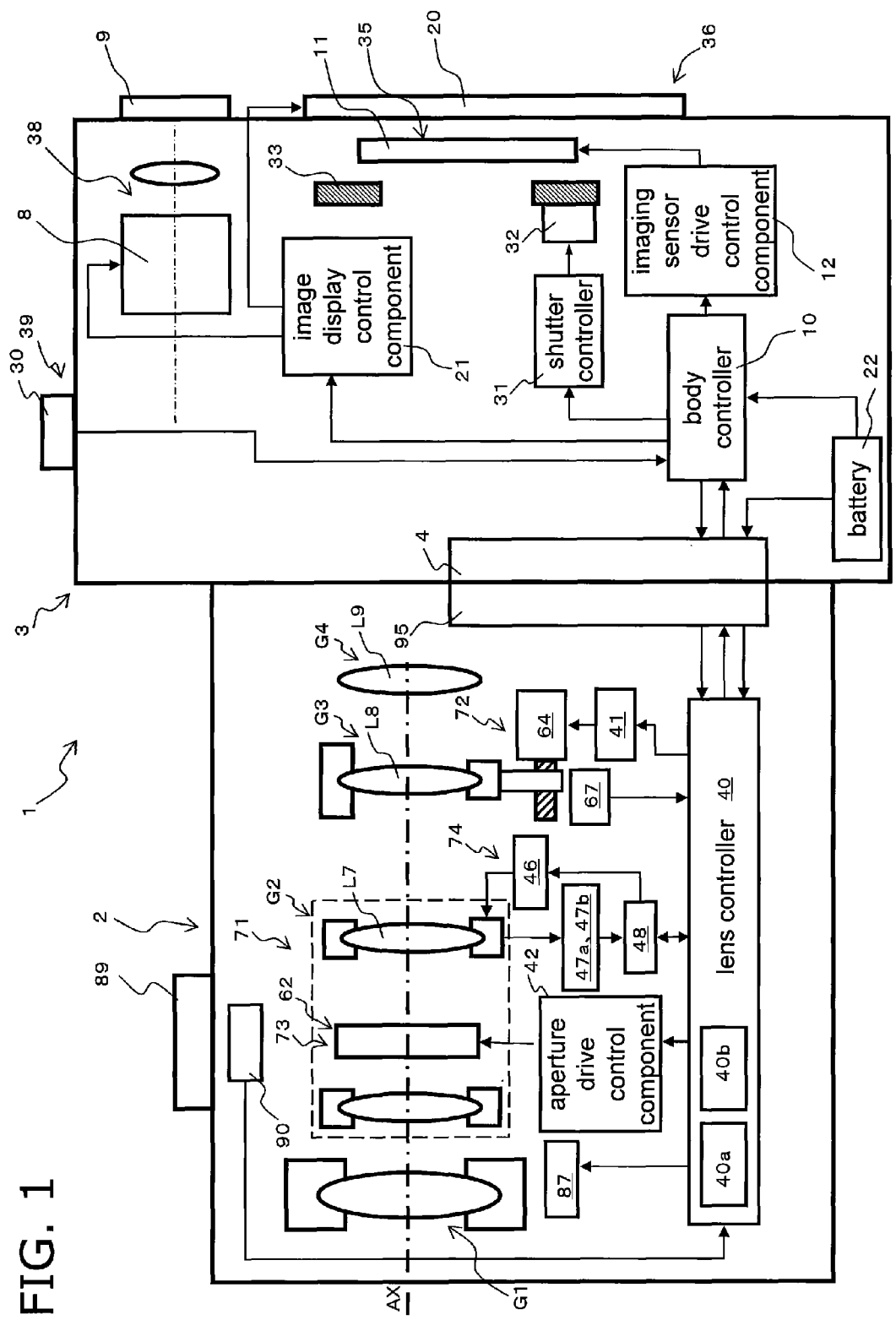
FIG. 1 is a diagram of the simplified configuration of a digital camera 1.
Figure 2:
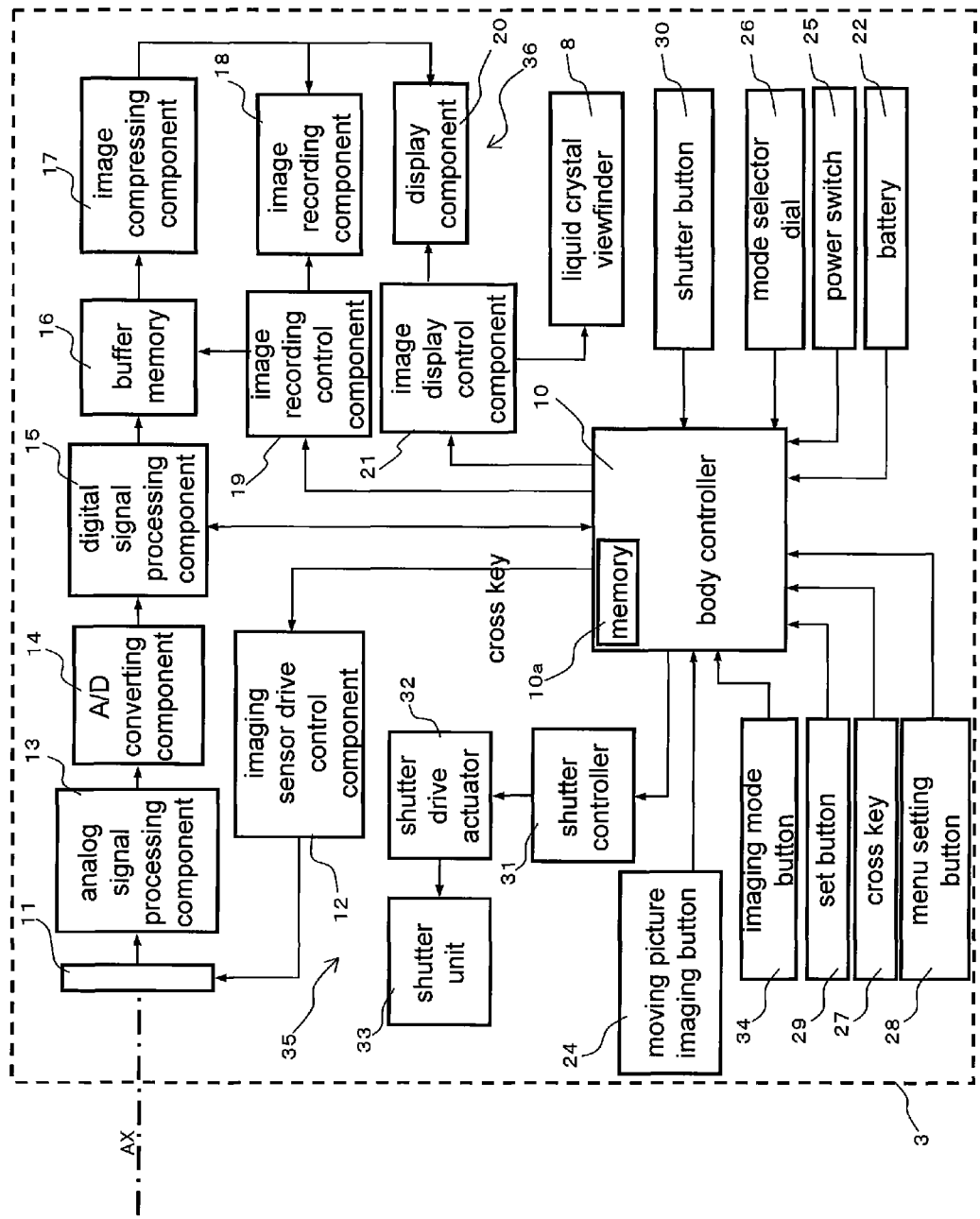
FIG. 2 is a block diagram of a camera body 3.

A digital camera 1 will be described through reference to FIGS. 1 to 3A and 3B. As shown in FIG. 1, the digital camera 1 (an example of an imaging device) is an interchangeable lens type of digital camera, and mainly comprises a camera body 3 (an example of a camera body) and an interchangeable lens unit 2 (an example of a lens barrel) that is removably mounted to the camera body 3. The interchangeable lens unit 2 is removably mounted to a body mount 4 provided to the front face of the camera body 3, via a lens mount 95.

This digital camera 1 is what is known as a mirror-less single-lens camera, in which no quick-return mirror is installed between the body mount 4 and an imaging sensor 11.

Simplified Configuration of Interchangeable Lens Unit

The simplified configuration of the interchangeable lens unit 2 will be described through reference to FIG. 1 and FIGS. 4 to 7. As shown in FIG. 1, the interchangeable lens unit 2 has an optical system O, a lens support mechanism 71 that supports the optical system O, a focus adjusting unit 72, an aperture adjustment unit 73, a blur correction unit 74, and a lens controller 40. Each of these will be described below.

(1) Optical System

The optical system O is a lens system for forming an optical image of a subject. More specifically, as shown in FIGS. 6 and 7, the optical system O has a first lens group G1, a second lens group G2, a third lens group G3, and a fourth lens group G4. The optical system O has an optical axis AX defined by these lens groups. A direction parallel to the optical axis AX will hereinafter be called the optical axis direction.

The first lens group G1 is disposed the farthest out on the subject side of all these lens groups, and has a first lens L1, a second lens L2, and a third lens L3. The second lens group G2 has a fourth lens L4, a fifth lens L5, a sixth lens L6, and a seventh lens L7. The seventh lens L7 is a correcting lens that corrects image blur caused by movement of the digital camera 1, and is disposed movably in a plane that is perpendicular to the optical axis direction. The third lens group G3 has an eighth lens L8 that functions as a focusing lens. The eighth lens L8 is disposed movably in the optical axis direction. The fourth lens group G4 is disposed farthest out on the image plane side of all these lens groups, and has a ninth lens L9 (an example of a rear lens element).

(2) Lens Support Mechanism

Figure 5:
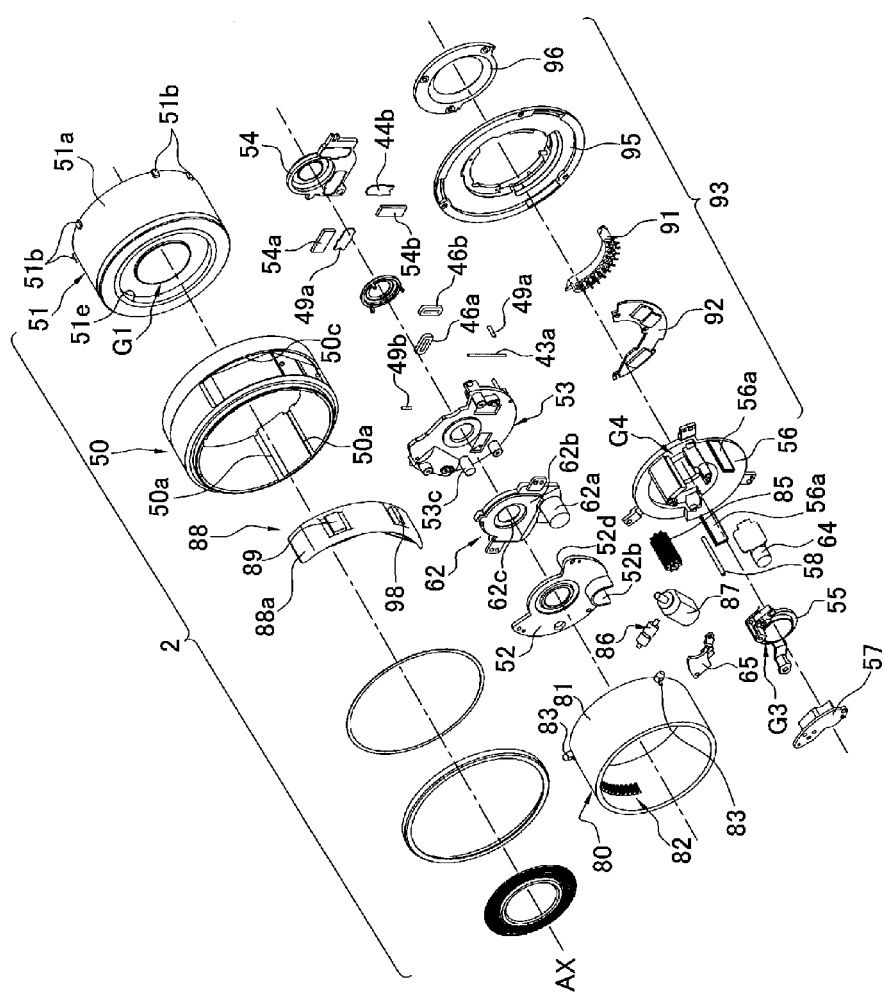
FIG. 5 is an exploded perspective view of the interchangeable lens unit 2.

The lens support mechanism 71 is used to support the first to fourth lens groups G1 to G4. As shown in FIG. 5, the lens support mechanism 71 has a lens housing 2a, a cam frame 80, a first lens support frame 51, a second lens support frame 69, a third lens support frame 55, a lens-side contact unit 91, an electrical board 92, a control lever unit 88, and an aperture unit 62.

(2-1) Lens Housing 2a

The lens housing 2a (an example of a first frame) constitutes part of the outer case of the interchangeable lens unit 2, and has a base member 93 (an example of a base member) and a fixed frame 50 (an example of an outer frame).

The base member 93 has a lens mount 95, a light blocking frame 96, and a fourth lens support frame 56. The base member 93 is fixed to the end of the fixed frame 50.

The lens mount 95 (an example of a lens mount) is an annular member that is mounted to the body mount 4 of the camera body 3, and has a bayonet 95a (see FIG. 18A) that is linkable to the body mount 4. The light blocking frame 96, which blocks out unwanted light, is attached to the lens mount 95. The fourth lens support frame 56 is also fixed to the lens mount 95.

The fourth lens group G4 is fixed to the fourth lens support frame 56. That is, the fourth lens group G4 is a lens group that does not move in the optical axis direction. The fourth lens support frame 56 has a support frame main body 56b and two rectilinear guide plates 56a that extend in the optical axis direction from the support frame main body 56b. The rectilinear guide plates 56a are inserted into rectilinear guide grooves 53k (discussed below) of a moving frame 53, respectively, and restrict the rotation of the second lens support frame 69. The rectilinear guide plates 56a are disposed on the inner peripheral side of the cam frame 80.

As discussed below, a zoom motor 87, a transmission mechanism 84 and a focus motor 64 are mounted to the base member 93. In this embodiment, the zoom motor 87, the transmission mechanism 84, and the focus motor 64 are fixed to the fourth lens support frame 56.

Figures 8A, 8B:
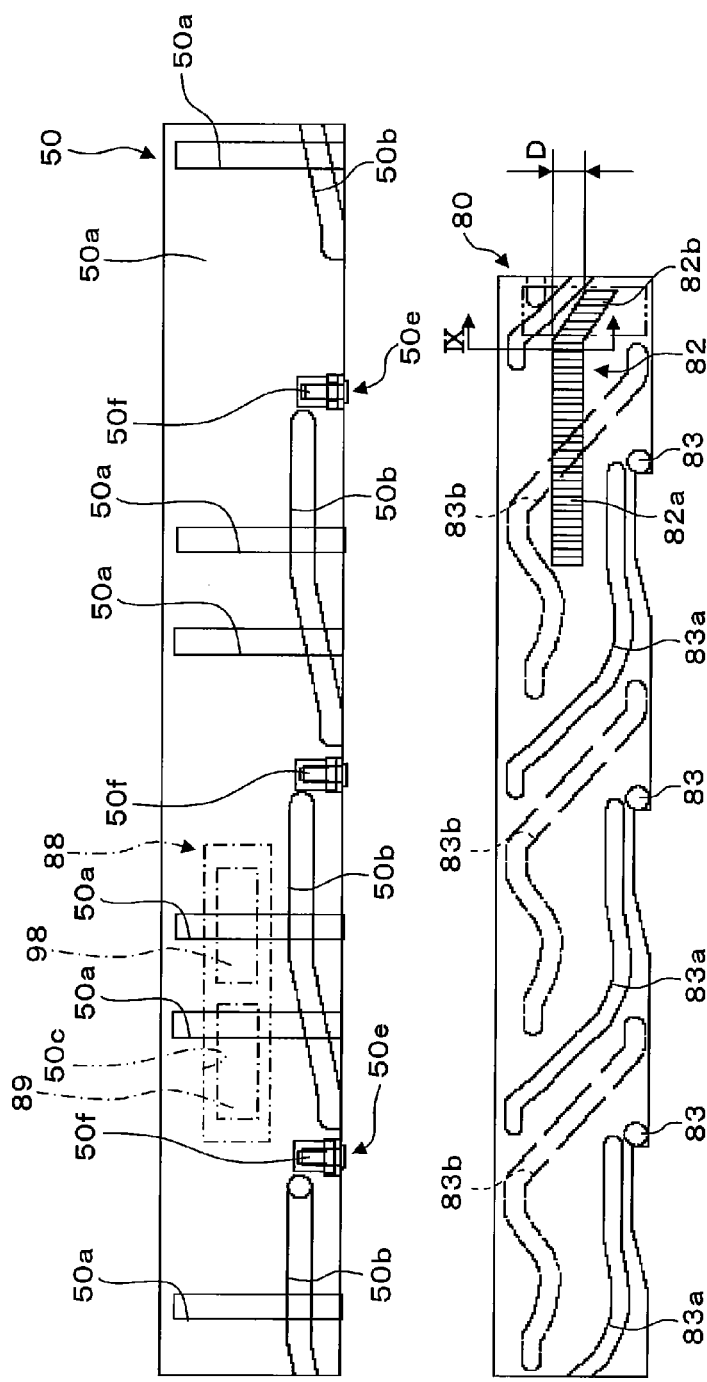
FIG. 8A is a inner peripheral development view of a fixed frame 50.
FIG. 8B is an inner peripheral development view of a cam frame 80.

The fixed frame 50 is fixed by three screws 50f to the outer peripheral part of the lens mount 95. The fixed frame 50 is a substantially cylindrical member that rotatably supports the cam frame 80. As shown in FIG. 8A, the fixed frame 50 has a plurality of rectilinear grooves 50a formed on its inner peripheral face. The rectilinear grooves 50a extend in the optical axis direction, and guide rectilinear protrusions 51b (discussed below) of the first lens support frame 51 in the optical axis direction. Since the rectilinear protrusions 51b are guided in the optical axis direction by the rectilinear grooves 50a, the first lens support frame 51 is able to move in the optical axis direction without rotating with respect to the fixed frame 50.

As shown in FIG. 8A, the fixed frame 50 has three guide cam grooves 50b formed on its inner peripheral face. The guide cam grooves 50b are provided in order to guide the cam frame 80 in the optical axis direction. Guide cam followers 83 (discussed below) of the cam frame 80 are inserted into the guide cam grooves 50b.

Also, the fixed frame 50 is fixed to the lens mount 95 of the base member 93 by three screws 50f. Here, the portions where the fixed frame 50 is fixed to the base member 93 by the screws 50f will be called the fixed components 50e. The three fixed components 50e are disposed equidistantly spaced in the peripheral direction. Also, the three fixed components 50e are disposed between the three guide cam grooves 50b in the peripheral direction, respectively, and do not interfere with the guide cam grooves 50b. It could also be said that the three guide cam grooves 50b are disposed between the three fixed components 50e in the peripheral direction, respectively.

A concave portion 50c is formed on the outer peripheral face of the fixed frame 50. The control lever unit 88 (discussed below) is fitted into this concave portion 50c. The concave portion 50c is disposed more on the subject side (the opposite side from the image plane) than the guide cam grooves 50b.

(2-2) Lens-Side Contact Unit 91

Figure 18B:
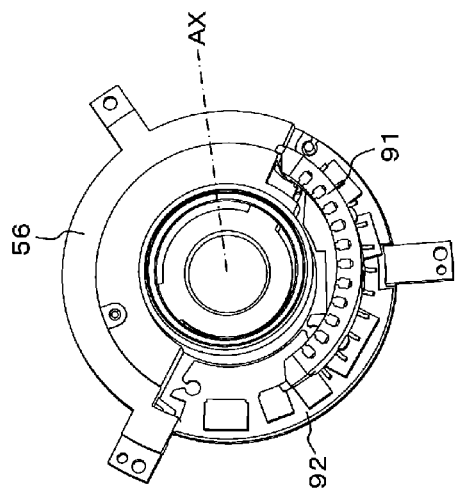
FIG. 18B is an oblique perspective view of a fourth lens support frame 56, a lens-side contact unit 91, and an electrical board 92.
Figure 18D:
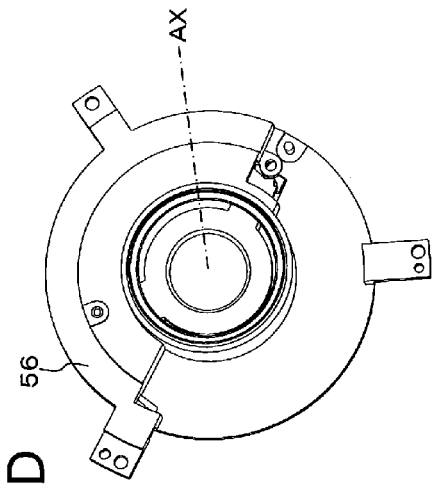
FIG. 18D is an oblique perspective view of the fourth lens support frame 56.
Figure 18A:
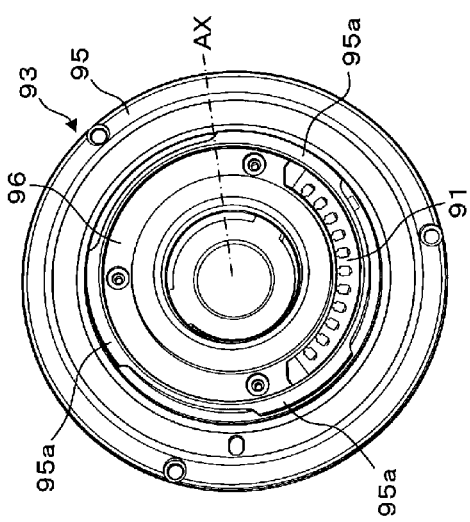
FIG. 18A is an oblique perspective view of a base member 93.

The lens-side contact unit 91 (an example of an electrical contact) is fixed to the lens housing 2a, and configured to be electrically connected to the camera body 3 (an example of an external device) via the body mount 4. As shown in FIGS. 18A and 18B, in this embodiment the lens-side contact unit 91 is fixed to the lens mount 95. The lens-side contact unit 91 extends in an arc shape around the optical axis AX. The lens-side contact unit 91 has a plurality of contacts disposed in an arc shape. The lens-side contact unit 91 is electrically connected to the electrical board 92.

(2-3) Electrical Board 92

Figure 6A:
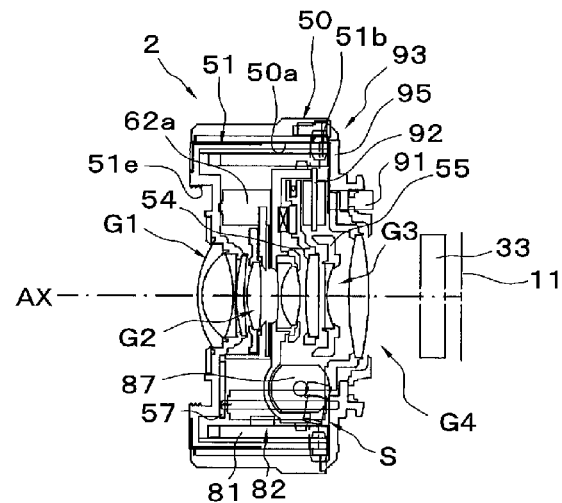
FIG. 6A is a simplified cross section of the interchangeable lens unit 2 in its stowed state.
Figure 18C:
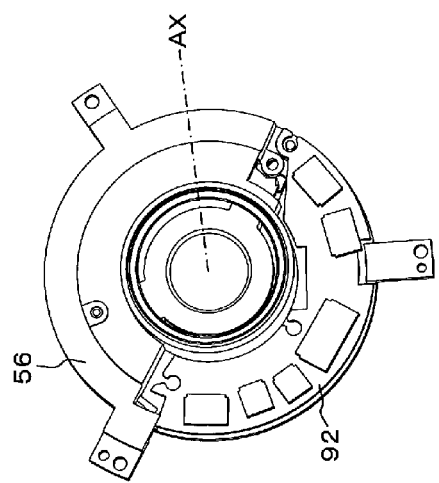
FIG. 18C is an oblique perspective view of the fourth lens support frame 56 and the electrical board 92.

The electrical board 92 (an example of an electrical board) is fixed to the lens housing 2a, and is electrically connected to the lens-side contact unit 91. In this embodiment, as shown in FIGS. 18B and 18C, the electrical board 92 is fixed to the fourth lens support frame 56. The lens controller 40, a focus drive control component 41, and a correction controller 48 are mounted as electronic parts to the electrical board 92. As shown in FIGS. 6 and 12, the electrical board 92 is disposed on the inner peripheral side of the cam frame 80 when viewed in the optical axis direction. In the stowed state as shown in FIG. 6A, the cam frame 80 is allowed to be close to base member 93 at a location that overlap the electrical board 92 when viewed in the direction perpendicular to the optical axis direction. This allows the cam frame 80 to be closer to the base member 93, and makes it possible to reduce the size of the interchangeable lens unit 2.

(2-4) Cam Frame 80

The cam frame 80 is rotatably supported by the lens housing 2a. More precisely, the cam frame 80 is supported rotatably around the optical axis AX by the fixed frame 50, and moves in the optical axis direction while rotating around the inner peripheral side of the fixed frame 50 respectively, or rotates without moving in the optical axis direction on the inner peripheral side of the fixed frame 50. The cam frame 80 is rotationally driven by a zoom drive unit 45.

The cam frame 80 has a substantially cylindrical main body component 81, the three guide cam followers 83, and a gear component 82. The three guide cam followers 83 are inserted into the three guide cam grooves 50b of the fixed frame 50, and protrude outward from the outer peripheral face of the main body component 81. When the cam frame 80 rotates with respect to the fixed frame 50, the guide cam followers 83 are guided by the guide cam grooves 50b. As a result, the cam frame 80 moves in the optical axis direction while rotating with respect to the fixed frame 50, or rotates with respect to the fixed frame 50 without moving in the optical axis direction. In this embodiment, when not in use (stowed state), the cam frame 80 moves more to the image plane side than the region of movement in the optical axis direction with respect to the lens housing 2a when in use. That is, when in use (see FIG. 6B), the cam frame 80 is deployed to the subject side with respect to the fixed frame 50, but when not in use (see FIG. 6A), the cam frame 80 moves to the image plane side with respect to the fixed frame 50, and is stowed inside the fixed frame 50.

The gear component 82 is disposed on the inner peripheral face of the main body component 81, and protrudes inward from the inner peripheral face of the main body component 81. The gear component 82 meshes with a first transmission gear 85 (discussed below) of the zoom drive unit 45. Drive force from the zoom drive unit 45 (more precisely, the transmission mechanism 84) is transmitted to the gear component 82.

The gear component 82 is disposed substantially in the middle of the main body component 81 in the optical axis direction. In a state in which the cam frame 80 has moved closest to the base member 93, a holding space S (an example of a holding space) is left between the gear component 82 and the base member 93 in the optical axis direction (see FIGS. 6A and 7A, for example).

The zoom drive unit 45 (the zoom motor 87 and the transmission mechanism 84) is disposed on the inner peripheral side of the main body 81. The zoom motor 87 and/or the transmission mechanism 84 is disposed more to the image plane side than the gear component 82. In a state in which the cam frame 80 is closest to the base member 93, the zoom motor 87 and the transmission mechanism 84 are inside the holding space S (see FIG. 6A, for example).

The two ends of the gear component 82 are at different positions in the optical axis direction. More specifically, as shown in FIG. 8A, the gear component 82 has a first gear component 82a and a second gear component 82b. The first gear component 82a extends in the peripheral direction around the inner peripheral face of the main body 81, and is used when the cam frame 80 rotates without moving in the optical axis direction with respect to the fixed frame 50. Meanwhile, the second gear component 82b is inclined with respect to the peripheral direction, and is disposed so as to gradually approach the base member 93 from the first gear component 82a. The second gear component 82b is used when the cam frame 80 moves in the optical axis direction while rotating with respect to the fixed frame 50.

As shown in FIG. 8A, the cam frame 80 has three inner peripheral cam grooves 83a (an example of a first cam groove, second cam groove, and third cam groove) and three outer peripheral cam grooves 83b (an example of outer peripheral cam grooves).

The inner peripheral cam grooves 83a are provided to guide the second lens support frame 69 in the optical axis direction, and are disposed on the inner peripheral face of the main body 81. Three cam followers 53e, 53f, and 53g of the moving frame 53 are inserted into the three guide cam followers 83, respectively. The gear component 82 is disposed so as to avoid the inner peripheral cam grooves 83a. The second gear component 82b of the gear component 82 is close to the inclined portion of the inner peripheral cam grooves 83a, and is disposed substantially along this inclined portion. Part of the inner peripheral cam grooves 83a (an example of first cam grooves) is disposed on the image plane side (base member 93 side) of the gear component 82 (more precisely, the first gear component 82a).

The outer peripheral cam grooves 83b are provided to guide the first lens support frame 51 in the optical axis direction, and are disposed on the outer peripheral face of the main body 81. Three inner peripheral cam followers 51d (discussed below) of the first lens support frame 51 are inserted into the three outer peripheral cam grooves 83b, respectively.

Figure 9:
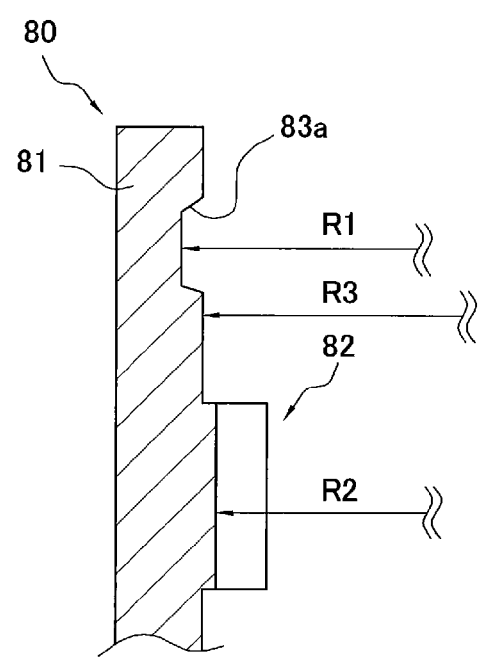
FIG. 9A is a cross section along the IX-IX line in FIG. 8B.
FIG. 9B is a cross section along the X-X line in FIG. 8B.
Figure 10B:
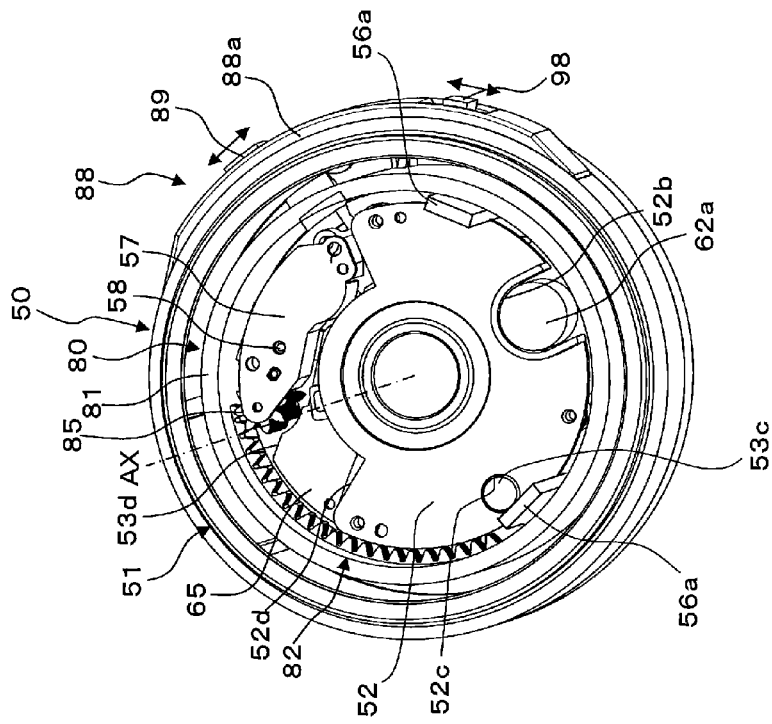
FIG. 10B is an oblique perspective view of the interchangeable lens unit 2 when a first lens support frame 51 has been removed.
Figure 10A:
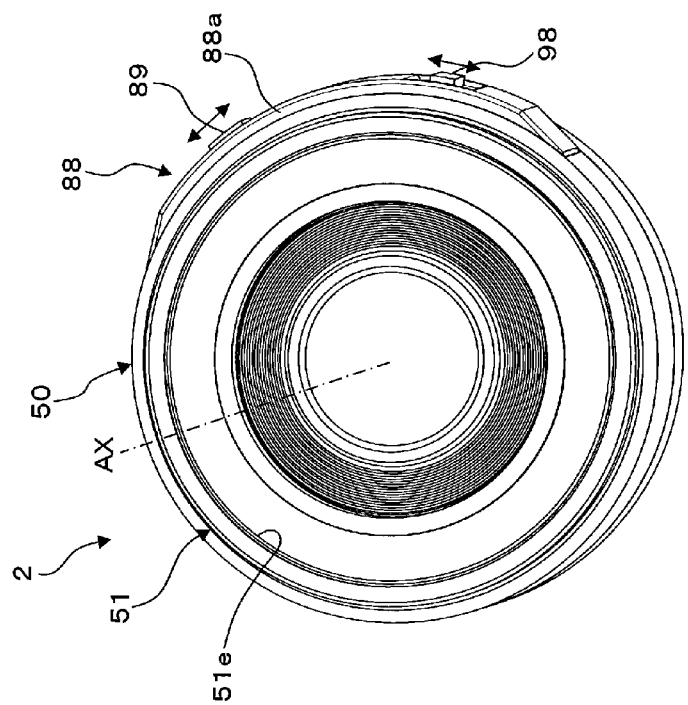
FIG. 10A is an oblique perspective view of the interchangeable lens unit 2.
Figure 11A:
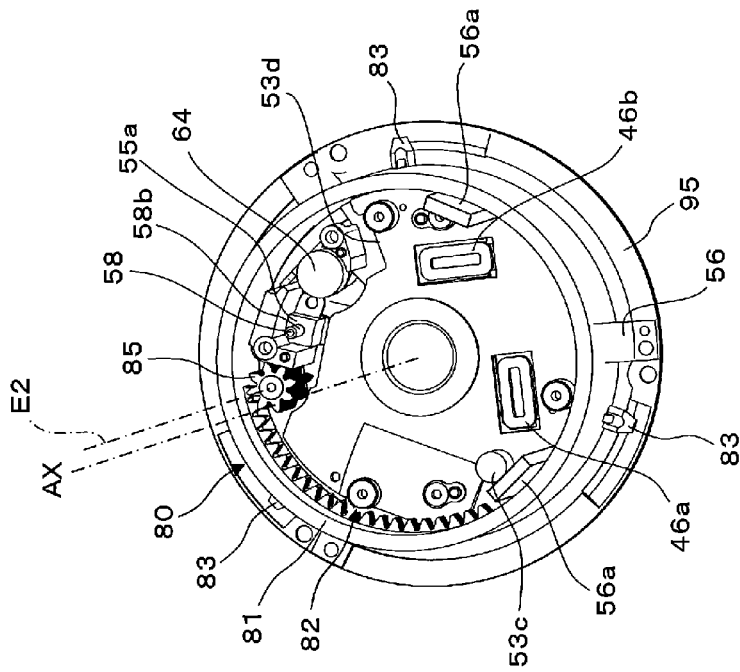
FIG. 11A is an oblique perspective view of the interchangeable lens unit 2 when a front lens frame 52 and a first support cover 57 have been removed from the state in FIG. 10A.
Figure 11B:
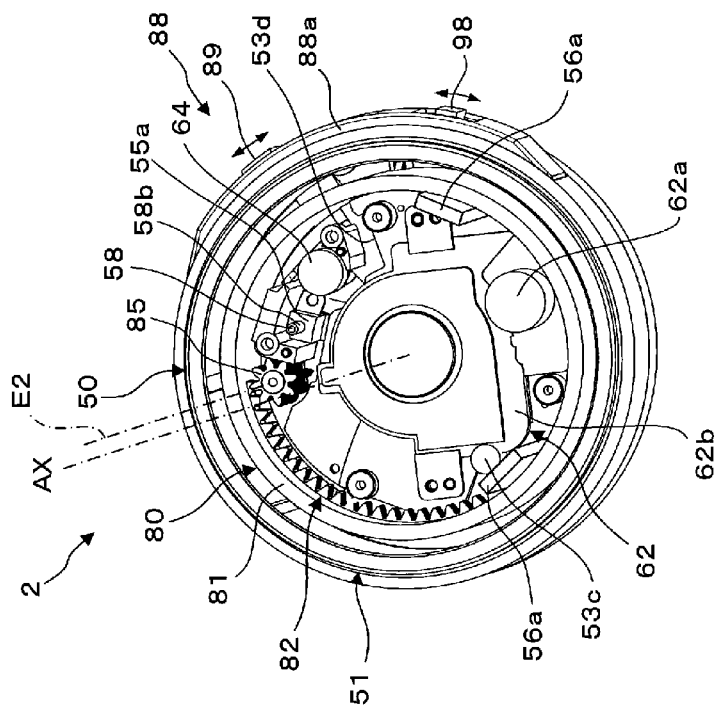
FIG. 11B is an oblique perspective view of the interchangeable lens unit 2, which is similar to FIG. 11A except that an aperture unit 62 and the fixed frame 50 have been removed from the state in FIG. 11A.

The dimensions of the gear component 82 in the radial direction will now be described. As shown in FIG. 9A, the gear component 82 protrudes inward in the radial direction from the inner peripheral face of the main body 81. Accordingly, the inside radius R1 of the bottom face of the inner peripheral cam grooves 83a is greater than the root radius R2 of the gear component 82. Also, the root radius R2 of the gear component 82 is less than the inside radius R3 of the main body 81. Therefore, even if the gear component 82 and the inner peripheral cam grooves 83a overlap, for example, this prevents the function of the inner peripheral cam grooves 83a from being lost at the overlapping portions. Also, even if the outer peripheral cam grooves 83b pass through the outer peripheral side of the gear component 82, a decrease in the strength of the cam frame 80 is suppressible. As shown in FIG. 9B, the root radius R2 is less than the inside radii R4 of the bottom faces of the outer peripheral cam grooves 83b.

(2-5) Zoom Drive Unit 45

The zoom drive unit 45 (an example of a drive actuator) is provided to adjust the focal distance of the optical system O. The zoom drive unit 45 is mounted to the lens housing 2a (more precisely, the fourth lens support frame 56), and rotationally drives the cam frame 80 with respect to the lens housing 2a. The zoom drive unit 45 has the zoom motor 87 and the transmission mechanism 84.

The zoom motor 87 (an example of a first actuator) is a DC motor, for example, and has a zoom driveshaft 87a (an example of a driveshaft) that outputs drive force. The zoom motor 87 may instead be another kind of motor, such as a stepping motor.

The zoom motor 87 is mounted to the lens housing 2a (more precisely, the fourth lens support frame 56). The lengthwise direction L of the zoom motor 87 is different from the optical axis direction. The "lengthwise direction L of the zoom motor 87" means a direction parallel to the longest side of an imaginary cuboid when the zoom motor 87 is elevated as a cuboid. Since the zoom motor 87 has the slender zoom driveshaft 87a, the lengthwise direction L of the zoom motor 87 is parallel to the rotational axis E1 of the zoom driveshaft 87a. Since the lengthwise direction L of the zoom motor 87 is parallel to the rotational axis E1, the rotational axis E1 of the zoom driveshaft 87a in a different direction from the optical axis direction, just as the lengthwise direction L is. In this embodiment, as shown in FIG. 12B, the lengthwise direction L and the rotational axis E1 of the zoom driveshaft 87a are disposed substantially parallel to a plane that is perpendicular to the optical axis direction.

The transmission mechanism 84 (an example of a transmission mechanism) transmits drive force from the zoom driveshaft 87a to the cam frame 80. The transmission mechanism 84 is mounted to the fourth lens support frame 56.

The transmission mechanism 84 reduces the rotational speed of the zoom driveshaft 87a and transmits this rotation to the gear component 82 of the cam frame 80. More specifically, as shown in FIG. 12B, the transmission mechanism 84 has a first transmission gear 85 (an example of a first transmission gear member, and an example of a drive gear member) that meshes with the gear component 82, and a second transmission gear 86 (an example of a second transmission gear member) that meshes with the first transmission gear 85 and transmits drive force from the zoom driveshaft 87a to the first transmission gear 85.

The first transmission gear 85 is rotatably supported by the fourth lens support frame 56 and a first support cover 57. The rotational axis E2 of the first transmission gear 85 is parallel to the optical axis direction, but the rotational axis E3 of the second transmission gear 86 faces in a different direction from the optical axis direction. In this embodiment, the rotational axis E3 of the second transmission gear 86 is inclined with respect to a plane that is perpendicular to the optical axis direction.

The zoom driveshaft 87a has an output gear 87b (an example of an output gear) that outputs drive force. The second transmission gear 86 has a first intermediate gear 86a that meshes with the output gear 87b, and a second intermediate gear 86b including a worm gear that meshes with the first transmission gear 85. The first intermediate gear 86a is a spur gear, for example. As shown in FIG. 12A, a second support cover 65 is fixed to the fourth lens support frame 56. The second transmission gear 86 is covered by the second support cover 65. The second transmission gear 86 is rotatably supported by the fourth lens support frame 56 and the second support cover 65.

Figure 14:
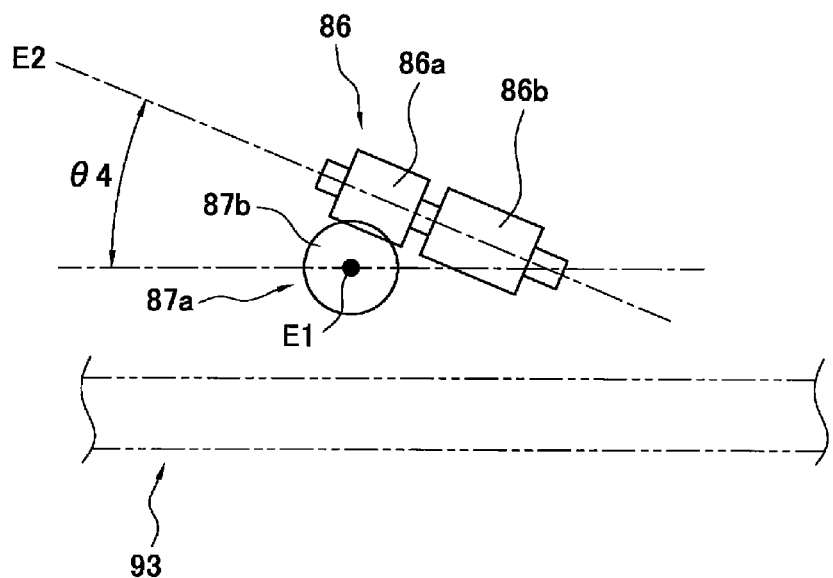
FIG. 14 shows the layout of a zoom driveshaft 87a and a second transmission gear 86.

As shown in FIG. 14, the rotational axis E3 of the second transmission gear 86 is inclined by substantially the same angle θ4 as the lead angle of the second intermediate gear 86b, with respect to a plane that is perpendicular to the optical axis direction. FIG. 14 shows the positional relation between the output gear 87b and the second transmission gear 86 when viewed in a direction parallel to the rotational axis E1 of the zoom driveshaft 87a. The output gear 87b is disposed between the second transmission gear 86 and the first intermediate gear 86a. The second intermediate gear 86b is disposed closer to the base member 93 than the first intermediate gear 86a.

Figure 15:
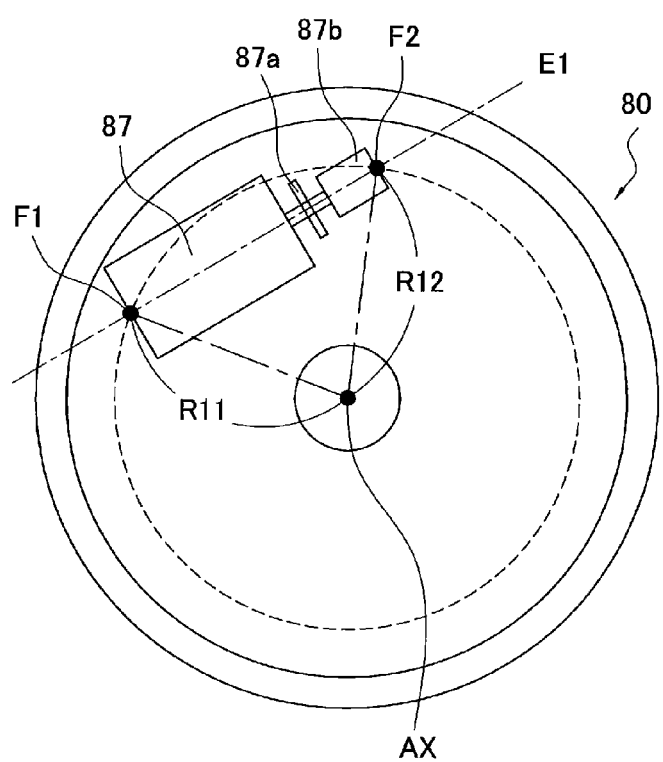
FIG. 15 shows the layout of the cam frame 80 and a zoom motor 87.
Figure 17A:
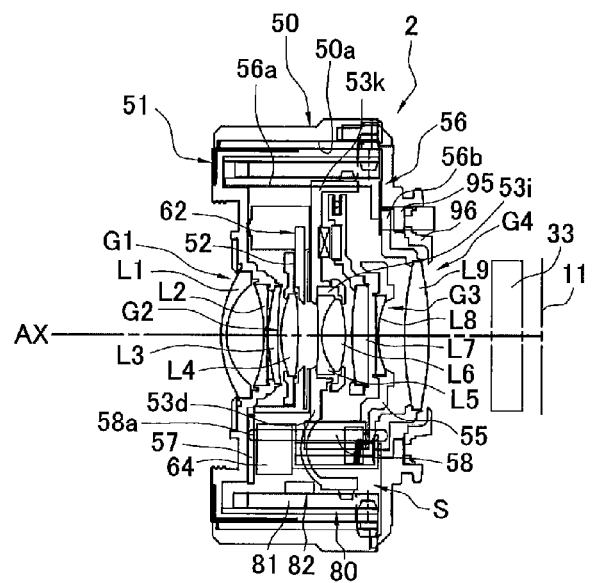
FIG. 17A is a simplified cross section of the interchangeable lens unit 2 in its stowed state.
Figure 17B:
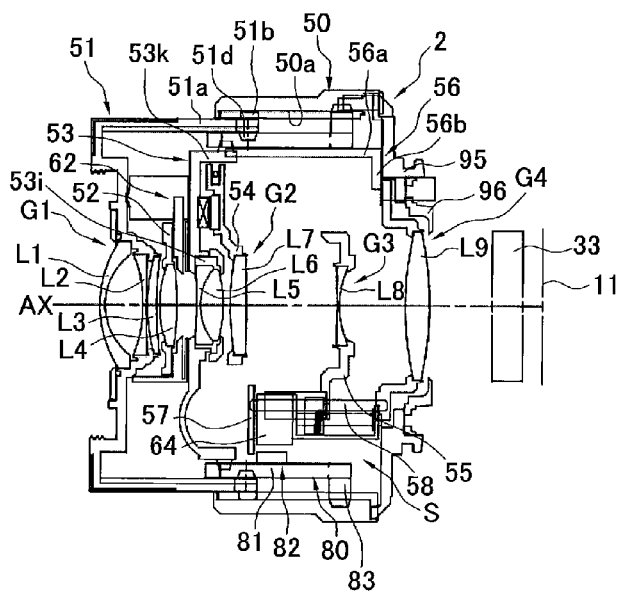
FIG. 17B is a simplified cross section of the interchangeable lens unit 2 at the telephoto end.

As shown in FIG. 15, the rotational axis E1 of the zoom driveshaft 87a is disposed substantially along the peripheral direction of the cam frame 80. Here, the phrase "the rotational axis E1 of the zoom driveshaft 87a is disposed substantially along the peripheral direction of the cam frame 80" means that, for example, in FIG. 15, the distances R11 and R12 from the points F1 and F2 where the ends of the zoom motor 87 intersect with the rotational axis E1 to the optical axis AX are substantially the same. This allows the zoom motor 87 to be efficiently disposed along the inner peripheral face of the cam frame 80.

(2-6) First Lens Support Frame 51

The first lens group G1 is fixed to the first lens support frame 51. The first lens support frame 51 is supported movably in the optical axis direction by the fixed frame 50 of the lens housing 2a, and its rotation is restricted by the fixed frame 50. When the cam frame 80 rotates with respect to the fixed frame 50, the first lens support frame 51 is driven in the optical axis direction by the cam frame 80.

As shown in FIG. 5 and FIGS. 6A to 7C, the first lens support frame 51 has three rectilinear protrusions 51b and three inner peripheral cam followers 51d. The three rectilinear protrusions 51b are inserted into the three rectilinear grooves 50a, respectively.

The three inner peripheral cam followers 51d are inserted into the outer peripheral cam grooves 83b, respectively. Since the rectilinear protrusions 51b are guided in the optical axis direction by the rectilinear grooves 50a, the first lens support frame 51 is able to move in the optical axis direction without rotating with respect to the fixed frame 50. Also, when the cam frame 80 rotates with respect to the fixed frame 50, the inner peripheral cam followers 51d are guided by the outer peripheral cam grooves 83b, so the first lens support frame 51 moves in the optical axis direction with respect to the fixed frame 50 according to the shape of the outer peripheral cam grooves 83b.

Also, a threaded portion 51e is formed on the front face of the first lens support frame 51. An optical filter, such as a polarizing filter or a protective filter, or a conversion lens can be attached to the threaded portion 51e.

(2-7) Second Lens Support Frame 69

The second lens support frame 69 supports the second lens group G2 and is guided by the cam frame 80 in the optical axis direction with respect to the lens housing 2a. More specifically, as shown in FIG. 5, the second lens support frame 69 has a front lens frame 52, the aperture unit 62, the moving frame 53, a correction lens frame 54, and a correction drive unit 46. The front lens frame 52, the aperture unit 62, the moving frame 53, the correction lens frame 54, and the correction drive unit 46 to be capable of moving as one in the optical axis direction.

The fourth lens L4 is fixed to the front lens frame 52. The front lens frame 52 is fixed to the moving frame 53 by screws, for example. The fifth lens L5 and the sixth lens L6 are fixed to the moving frame 53 by adhesive, for example. When the fifth lens L5 and the sixth lens L6 are fixed to the moving frame 53, the positions of the fifth lens L5 and the sixth lens L6 with respect to the fourth lens L4 are adjusted so that the optical axis center of the fifth lens L5 and the sixth lens L6 and the optical axis center of the fourth lens L4 will be disposed coaxially. After position adjustment, three adhesive reservoirs 53i (see FIGS. 16A and 16C) provided to the moving frame 53 are coated with an adhesive agent and the adhesive is cured, which fixes the fifth lens L5 and the sixth lens L6 to the moving frame 53. How the front lens frame 52 is fixed is not limited to the above method, and adhesive bonding or other fixing methods may also be used. Also, how the fifth lens L5 and the sixth lens L6 are fixed is not limited to the above method, and some other fixing method may be used instead.

The aperture unit 62 is disposed movably in the optical axis direction with respect to the lens housing 2a, and adjusts the amount of light. The aperture unit 62 has a plurality of aperture vanes 62c that is configured to vary the optical path diameter, an aperture support frame 62b that supports the aperture vanes 62c, and an aperture drive motor 62a that adjusts the amount of light by driving the plurality of aperture vanes 62c. The aperture drive motor 62a is fixed to the aperture support frame 62b, and protrudes on the subject side from the aperture support frame 62b. The aperture unit 62 is disposed between the moving frame 53 and the front lens frame 52.

The fifth lens L5 and the sixth lens L6 are fixed to the moving frame 53. The moving frame 53 is guided by the cam frame 80 in the optical axis direction with respect to the lens housing 2a. More specifically, as shown in FIGS. 16A to 16C, the moving frame 53 has a moving frame main body 53a, the three cam followers 53e, 53f, and 53g, a holder portion 53c, and the two rectilinear guide grooves 53k. The moving frame main body 53a is a substantially annular member, but one part is cut away on the outer peripheral side. The three cam followers 53e, 53f, and 53g protrude outward from the outer peripheral part of the moving frame main body 53a, and are inserted into the three inner peripheral cam grooves 83a of the cam frame 80, respectively.

The two rectilinear guide grooves 53k extend in the optical axis direction, and are disposed spaced apart in the peripheral direction. The rectilinear guide plates 56a of the fourth lens support frame 56 are inserted into the rectilinear guide grooves 53k, respectively. This allows the moving frame 53 to move in the optical axis direction without rotating with respect to the lens housing 2a.

The holder portion 53c is a cylinder that is closed at one end, and protrudes on the subject side from the moving frame main body 53a. The end 59a of a focusing sub-shaft 59 is configured to be inserted in the optical axis direction into the holder portion 53c. When the moving frame main body 53a approaches the third lens support frame 55, the end of the focusing sub-shaft 59 is inserted into the holder portion 53c. This prevents the moving frame 53 from interfering with the focusing sub-shaft 59, and ensures a large range of motion for both the third lens support frame 55 and the moving frame 53.

As shown in FIG. 16A, the correction lens frame 54 is disposed on the image plane side of the moving frame 53, and is supported movably in a plane that is perpendicular to the optical axis direction by the moving frame 53. The seventh lens L7 is fixed to the correction lens frame 54.

A rotational support shaft 49a, a first slide pole 43a, and a second slide pole 43b are fixed to the moving frame 53. The correction lens frame 54 is supported movably in the pitch direction with respect to the moving frame 53 by the first slide pole 43a and the second slide pole 43b. Also, movement of the correction lens frame 54 in the optical axis direction with respect to the moving frame 53 is restricted by the first slide pole 43a and the second slide pole 43b. Further, the correction lens frame 54 is guided movably in the yaw direction by the rotational support shaft 49a, and rotates around the rotational support shaft 49a. This allows the seventh lens L7 to be moved in a plane that is perpendicular to the optical axis AX.

As shown in FIG. 16A, a restricting shaft 49b is fixed to the moving frame 53. The correction lens frame 54 has a restricted part 54c having a hole 54d. The restricting shaft 49b is inserted into the hole 54d of the restricted part 54c and restricts the movement of the correction lens frame 54 with respect to the moving frame 53 to a specific range.

The method for assembling the correction lens frame 54 will now be described. First, the rotational support shaft 49a, the first slide pole 43a, and the second slide pole 43b are fixed to the moving frame 53. Three support grooves (not shown) are formed in the correction lens frame 54. The correction lens frame 54 is attached to the moving frame 53 so that the first slide pole 43a will fit into two of the support grooves, and the second slide pole 43b will fit into the remaining support groove. At this point, the rotational support shaft 49a is fitted into a rotational support groove (not shown) of the correction lens frame 54. As a result, the correction lens frame 54 is supported by the moving frame 53 movably in a plane that is perpendicular to the optical axis direction. At this point movement of the correction lens frame 54 in the optical axis direction is restricted with respect to the moving frame 53.

Next, the restricting shaft 49b is fixed by press-fitting, for example, to the moving frame 53. The restricting shaft 49b is press-fitted into the hole 54d in the restricted part 54c of the correction lens frame 54, and is disposed at a position that does not overlap the aperture unit 62 when viewed in the optical axis direction. Therefore, when the restricting shaft 49b is press-fitted to the moving frame 53, the face of the moving frame 53 on the opposite side from the restricting shaft 49b (the subject side) is directly received by a jig, allowing the work of press-fitting the restricting shaft 49b to be carried out easily.

The correction lens frame 54 is attached to the moving frame 53 in this manner.

The correction lens frame 54 is driven in two directions in a plane that is perpendicular to the optical axis direction, by the correction drive unit 46. The correction drive unit 46 has a first magnet 54a, a second magnet 54b, a first yoke 44a, a second yoke 44b, a first coil 46a, and a second coil 46b. As shown in FIG. 12A, the first magnet 54a and the second magnet 54b are fixed on the subject side of the correction lens frame 54. The first yoke 44a is attached to the face of the first magnet 54a on the opposite side from the first coil 46a (the subject side). The second yoke 44b is attached to the face of the second magnet 54b on the opposite side from the second coil 46b (the subject side). Meanwhile, the first coil 46a and the second coil 46b are fixed on the image plane side of the moving frame 53. The first magnet 54a, the first yoke 44a and the first coil 46a constitute an electromagnetic actuator. The second magnet 54b, the second yoke 44b and the second coil 46b constitute an electromagnetic actuator. The electromagnetic force of these electromagnetic actuators drives the correction lens frame 54 in a plane that is perpendicular to the optical axis AX.

The configuration of the moving frame 53 will now be described in further detail.

As shown in FIGS. 16A to 16C, when the second lens support frame 69 is closest to the base member 93, the zoom motor 87 is housed inside the moving frame 53 as shown in FIG. 16C, for example. At this point, the cam follower 53e (an example of a first cam follower) is disposed on the outer peripheral side of the zoom motor 87 when viewed in the optical axis direction.

The focus motor 64, the first transmission gear 85, and a focusing main shaft 58 are disposed in the peripheral direction between the cam follower 53e and the cam follower 53f. A cut-out 53d is formed in the peripheral direction between the two cam followers 53e and 53f. The focus motor 64 is disposed in the peripheral direction between the cam follower 53e and the cam follower 53f when viewed in the optical axis direction. The focus motor 64, the first transmission gear 85, and the focusing main shaft 58 are disposed within the cut-out 53d.

Because the focus motor 64, the first transmission gear 85, and the focusing main shaft 58 are disposed within the cut-out 53d, a relatively large spacing is ensured in the peripheral direction between the cam follower 53e and the cam follower 53f. More specifically, as shown in FIGS. 16A and 16B, the central angle θ1 between the cam follower 53e and the cam follower 53f is greater than the central angle θ2 between the cam follower 53f and the cam follower 53g, and is greater than the central angle θ3 between the cam follower 53g and the cam follower 53e. That is, the central angle θ1 is greater than 120 degrees. The central angle θ1 may be set to 120 degrees or more. In this embodiment, the central angle θ2 is the same as the central angle θ3.

Figure 7A:
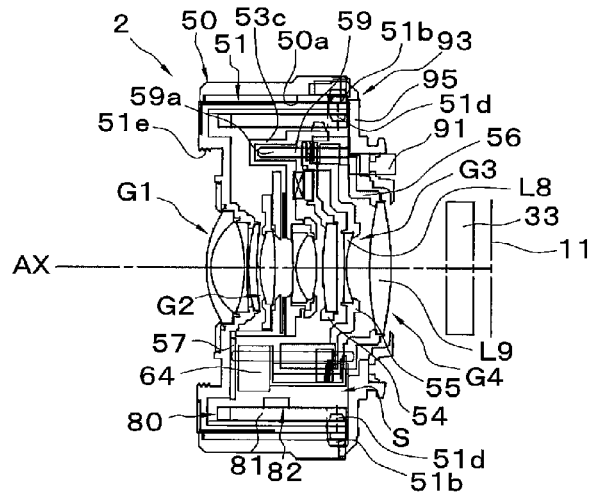
FIG. 7A is a simplified cross section of the interchangeable lens unit 2 in its stowed state.
Figure 7B:
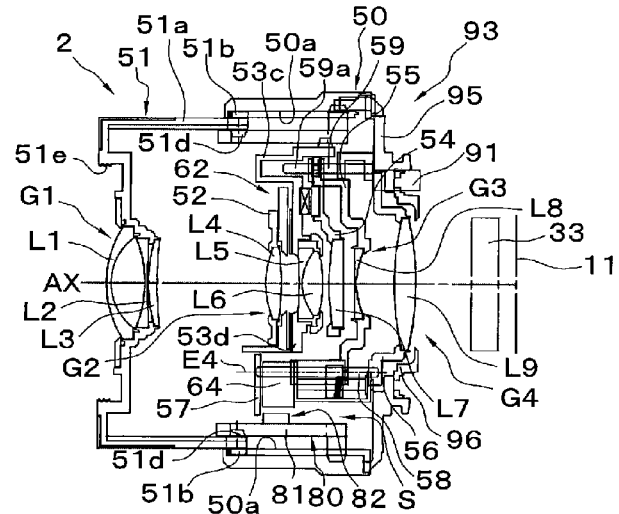
FIG. 7B is a simplified cross section of the interchangeable lens unit 2 at the wide angle end.
Figure 7C:
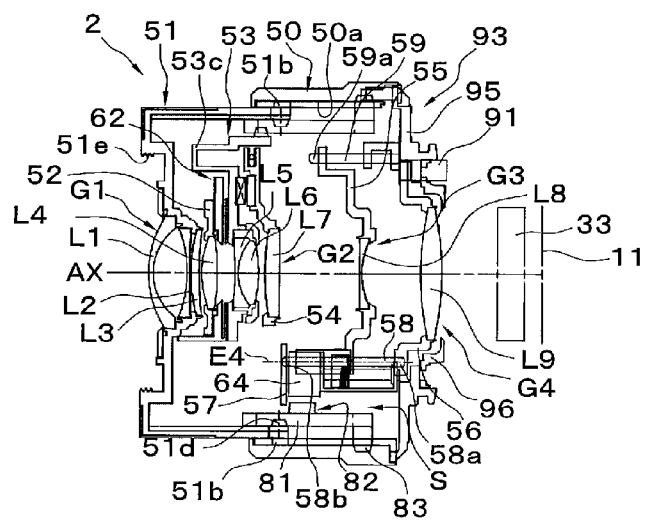
FIG. 7C is a simplified cross section of the interchangeable lens unit 2 at the telephoto end.

Also, since the cut-out 53d is formed relatively large in the peripheral direction, the gear component 82 is capable of moving into the cut-out 53d. More specifically, as shown in FIGS. 7A to 7C, the gear component 82 of the cam frame 80 moves into the cut-out 53d in the course of the moving frame 53 being guided in the optical axis direction by the cam frame 80. Because the cut-out 53d is provided, the gear component 82 does not hinder the movement of the second lens support frame 69, so the interchangeable lens unit 2 is made thinner.

As shown in FIG. 6A, in the stowed state of the interchangeable lens unit 2, part of the outer peripheral part of the moving frame 53 goes into the stowage space S formed between the gear component 82 and the base member 93. Consequently, the stowage space S on the image plane side of the gear component 82 is more effectively utilized, the interchangeable lens unit 2 is made even more compact.

(2-8) Third Lens Support Frame 55

The third lens group G3 (eighth lens L8) is fixed to the third lens support frame 55. The third lens support frame 55 is disposed movably in the optical axis direction with respect to the lens housing 2a. The third lens support frame 55 is supported movably in the optical axis direction by the lens housing 2a. More specifically, the third lens support frame 55 has a bearing component 55a, a rotation restricting arm 55b, and a rack 55c.

The bearing component 55a extends in the optical axis direction and has a sliding hole. The focusing main shaft 58 is inserted into this sliding hole. A first end 58a of the focusing main shaft 58 is fixed to the fourth lens support frame 56. A second end 58b of the focusing main shaft 58 is fixed to the first support cover 57, which is fixed to the fourth lens support frame 56. Therefore, the third lens support frame 55 is guided in the optical axis direction by the focusing main shaft 58.

The focusing sub-shaft 59 is fixed to the fourth lens support frame 56. The focusing sub-shaft 59 is inserted into a restricting hole 55d in the rotation restricting arm 55b of the third lens support frame 55. The focusing sub-shaft 59 restricts rotation of the third lens support frame 55 around the focusing main shaft 58 with respect to the lens housing 2a.

The rack 55c meshes with a lead screw of a focus driveshaft 64a of the focus motor 64. When the focus driveshaft 64a rotates, the rack 55c is guided in the optical axis direction by the lead screw, and the third lens support frame 55 moves in the optical axis direction with respect to the fourth lens support frame 56.

(2-9) Focus Motor 64

The focus motor 64 has the focus driveshaft 64a (an example of a rotating shaft) that outputs drive force, and drives the third lens support frame 55 in the optical axis direction. The rotational axis E4 of the focus driveshaft 64a is substantially parallel to the optical axis direction. The focus driveshaft 64a has a lead screw that meshes with the rack 55c of the third lens support frame 55. When the focus driveshaft 64a rotates, the rack 55c is driven in the optical axis direction by the lead screw. This is how the third lens support frame 55 is driven in the optical axis direction.

The first transmission gear 85 is rotatably supported by the first support cover 57 and the fourth lens support frame 56. Also, the zoom motor 87, the focusing main shaft 58, the bearing component 55a, and the focus motor 64 are housed inside the first support cover 57. The first support cover 57 has a shape that is complementary with the cut-out 53d in the moving frame 53, and when the second lens support frame 69 moves toward the base member 93, the first support cover 57 enters the cut-out 53d.

(2-10) Control lever Unit 88

The control lever unit 88 has a zoom lever 89, a support base 88a, a zoom lever detect component 90 (see FIG. 1), a focus lever 98, and a focus lever detect component 99.

The zoom lever 89 is provided to adjust the focal distance of the optical system O, and is disposed on the outer peripheral part of the fixed frame 50. The zoom lever 89 is provided rotatably in the peripheral direction with respect to the lens housing 2a. More specifically, the zoom lever 89 is supported movably in the peripheral direction by the fixed frame 50 via the support base 88a. The zoom lever 89 is able to move in two directions: toward the wide angle side and toward the telephoto side.

The focus lever 98 is provided to adjust the imaging distance from the digital camera 1 to the main subject in focus (also called the subject distance), and is disposed on the outer peripheral part of the fixed frame 50. The focus lever 98 is provided rotatably in the peripheral direction with respect to the lens housing 2a. More specifically, the focus lever 98 is supported movably in the peripheral direction by the fixed frame 50 via the support base 88a. The focus lever 98 is able to move in two directions: toward the close-up side and toward the infinity side.

Figure 19:
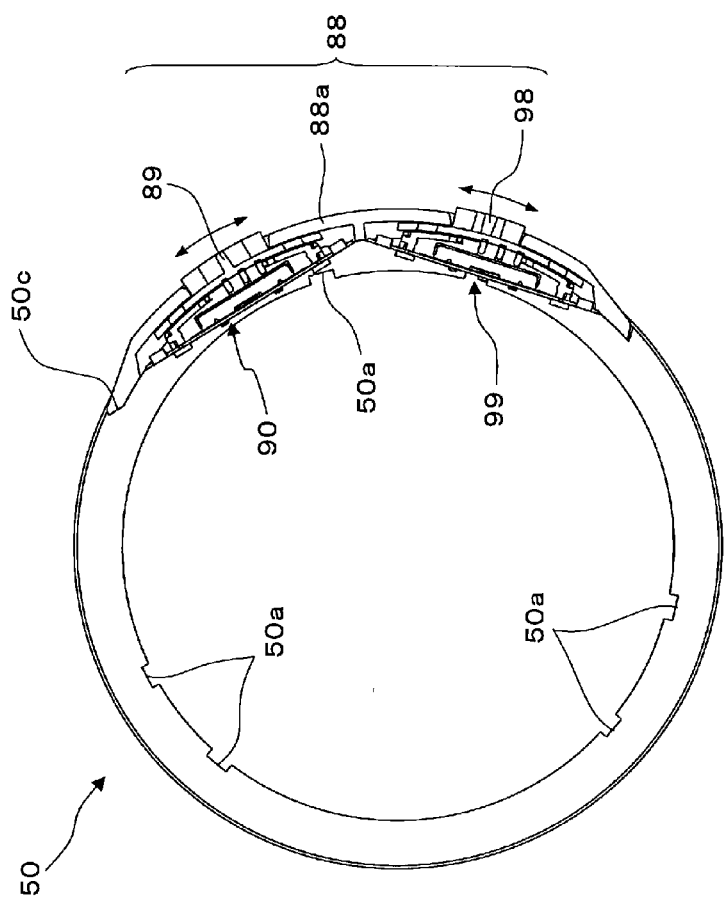
FIG. 19 is a plan view of a control lever unit 88.

The support base 88a movably supports the zoom lever 89 and the focus lever 98, and is fixed to the outer peripheral part of the fixed frame 50. More precisely, the support base 88a is fitted into the concave portion 50c of the fixed frame 50 (see FIG. 19). Part of the support base 88a goes into the inside from the outer peripheral edge of the fixed frame 50. Accordingly, part of the zoom lever 89 and part of the focus lever 98 also go into the inside from the outer peripheral edge of the fixed frame 50. Thus, the thickness of the fixed frame 50 is effectively utilized as a space for installing the control lever unit 88 and the focus lever 98.

The zoom lever detect component 90 is provided to detect the position of the zoom lever 89, and is electrically connected to the lens controller 40. The lens controller 40 is configured to identify the direction in which the zoom lever 89 is operated on the basis of the detection result of the zoom lever detect component 90.

The focus lever detect component 99 is provided to detect the position of the focus lever 98, and is electrically connected to the lens controller 40. The lens controller 40 is configured to identify the direction in which the focus lever 98 is operated on the basis of the detection result of the focus lever detect component 99.

The layout of the control lever unit 88 will now be described in greater detail. As shown in FIG. 8A, the zoom lever 89 and the focus lever 98 are disposed at positions that do not overlap the three guide cam grooves 50b. More precisely, the zoom lever 89 and the focus lever 98 are disposed at positions that are farther from the base member 93 in the optical axis direction than the three guide cam grooves 50b. In other words, the zoom lever 89 and the focus lever 98 are disposed more toward the subject side than the three guide cam grooves 50b in the optical axis direction.

(3) Aperture Adjustment Unit 73

As shown in FIG. 1, the aperture adjustment unit 73 has the above-mentioned aperture unit 62 and an aperture drive control component 42 that controls the aperture drive motor 62a of the aperture unit 62. The aperture drive motor 62a is a stepping motor, for example. The aperture drive control component 42 sends drive pulses to the aperture drive motor 62a on the basis of a command from the lens controller 40. This allows the aperture value of the optical system O to be adjusted to the desired value.

(4) Focus Adjusting Unit 72

As shown in FIG. 1, the focus adjusting unit 72 has the focus motor 64, the focus drive control component 41, and a photosensor 67. As discussed above, the focus motor 64 is fixed to the fourth lens support frame 56, and drives the third lens support frame 55 in the optical axis direction. In this embodiment, the focus motor 64 is a stepping motor.

The focus drive control component 41 sends drive pulses to the focus motor 64 on the basis of a command from the lens controller 40. The photosensor 67 detects whether or not the third lens support frame 55 is disposed at a specific position in the optical axis direction (the home position). The photosensor 67 is fixed to the fourth lens support frame 56, for example. This photosensor 67 has a light emitting component (not shown) and a light receiving component (not shown). When the detected part (not shown) of the third lens support frame 55 moves in between the light emitting component and the light receiving component, the photosensor 67 detects the detected part. The lens controller 40 is capable of detecting that the third lens support frame 55 is in the home position on the basis of the detection result of the photosensor 67.

The photosensor 67 is capable of detecting whether or not the third lens support frame 55 is in the home position, and detecting the presence of a focus home point detected part 52f. That is, the photosensor 67 is capable of detecting the home position of the fourth lens support frame 56, that is, a focus movable unit 94 with respect to the lens mount 95. The photosensor 67 may instead be some other kind of sensor, such as a combination of a magnet and a magnetic sensor.

(5) Blur Correction Unit

As shown in FIG. 1, the blur correction unit 74 is used to suppress blurring of the optical image with respect to the imaging sensor 11, which is attributable to movement of the digital camera 1, and has the correction drive unit 46, a first position detection sensor 47a, a second position detection sensor 47b, and the correction controller 48.

As discussed above, the correction drive unit 46 drives the correction lens frame 54 in a plane that is perpendicular to the optical axis AX. More specifically, as shown in FIG. 16A, the correction drive unit 46 has the first magnet 54a, the second magnet 54b, the first coil 46a, and the second coil 46b. The first magnet 54a and the second magnet 54b are fixed to the correction lens frame 54. The first coil 46a and the second coil 46b are fixed to the moving frame 53. The first magnet 54a and the first coil 46a constitute an electromagnetic actuator, and drive the correction lens frame 54 in the pitch direction with respect to the moving frame 53 by electromagnetic force. The second magnet 54b and the second coil 46b constitute an electromagnetic actuator, and drive the correction lens frame 54 in the yaw direction with respect to the moving frame 53 by electromagnetic force.

As shown in FIGS. 1 and 16A, the first position detection sensor 47a detects the position of the correction lens frame 54 in the pitch direction with respect to the moving frame 53. The second position detection sensor 47b detects the position of the correction lens frame 54 in the yaw direction with respect to the moving frame 53. The first position detection sensor 47a and the second position detection sensor 47b are Hall elements, for example. The first position detection sensor 47a is disposed near the first magnet 54a. The second position detection sensor 47b is disposed near the second magnet 54b.

A movement detection sensor (not shown), such as a gyro sensor, is installed in the interchangeable lens unit 2. The correction controller 48 controls the correction drive unit 46 on the basis of the detection result of a position detection sensor 47 and the detection result of a movement detection sensor.

The method for suppressing blurring of the subject image may be electronic blur correction in which blurring that appears in an image is corrected on the basis of image data outputted from the imaging sensor 11. The method for suppressing blurring of the subject image may also be a sensor shift method in which the imaging sensor 11 is driven in a plane that is perpendicular to the optical axis AX.

(6) Lens Controller 40

As shown in FIG. 1, the lens controller 40 has a CPU (not shown), a ROM (not shown), and a memory 40a, and can carry out various functions by using the CPU to execute programs stored in the ROM. For instance, the lens controller 40 is capable of detecting that the third lens support frame 55 is in its home position on the basis of the detection result of the photosensor 67.

The memory 40a is a nonvolatile memory, and can hold stored information even when the power supply has been halted. Information related to the interchangeable lens unit 2 (lens information), for example, is held in the memory 40a.

The lens controller 40 further has a counter 40b. The counter 40b counts the number of drive pulses of the focus motor 64. The lens controller 40 is capable of identifying the position of the third lens group G3 in the optical axis direction by counting the number of drive pulses of the focus motor 64 from a state in which the third lens support frame 55 is in its home position.

Planar Positional Relations of Various Members

The planar positional relations of the constituent members of the interchangeable lens unit 2 will now be described in greater detail through reference to FIG. 20.

Figure 20:
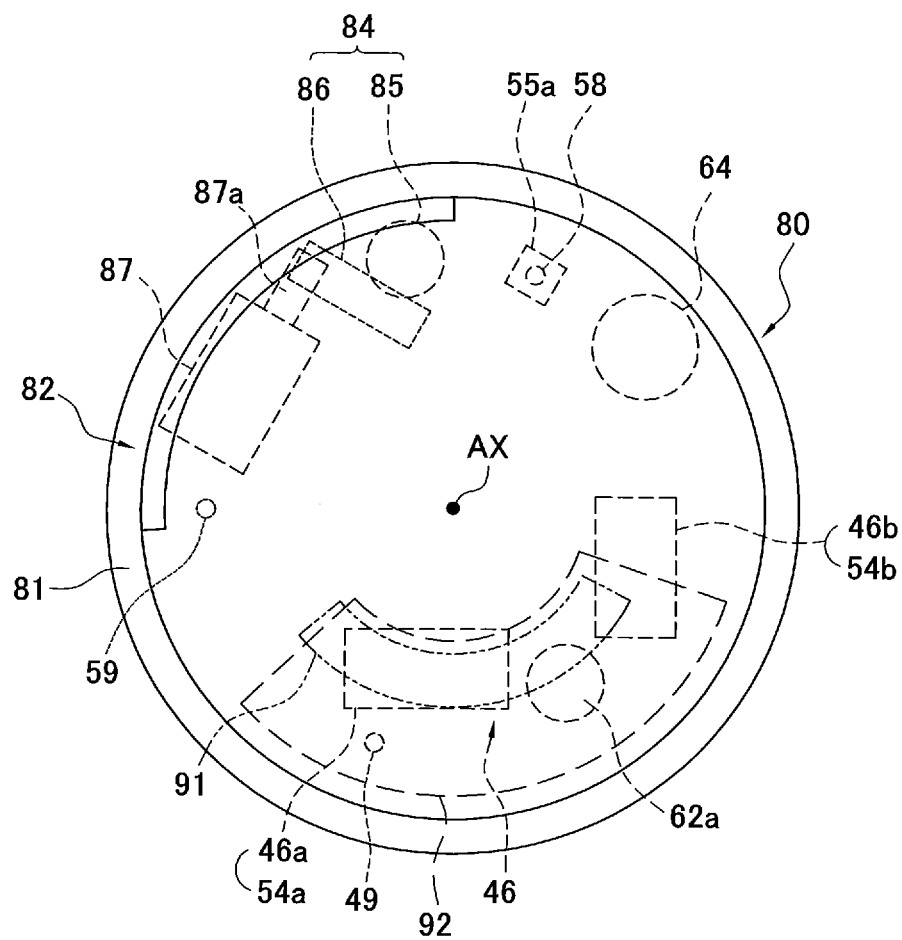
FIG. 20 shows the positional relations of the various members in plan view when viewed in the optical axis direction.

As shown in FIG. 20, several of the constituent members included in the interchangeable lens unit 2 are dispersively arranged over a plane when viewed in the optical axis direction.

More specifically, the zoom motor 87 and the transmission mechanism 84 are disposed at positions that do not overlap the focus motor 64, the lens-side contact unit 91, the electrical board 92, the aperture drive motor 62a, the correction drive unit 46 (the first magnet 54a, the second magnet 54b, the first coil 46a, and the second coil 46b), the focusing main shaft 58, the focusing sub-shaft 59, or the restricting shaft 49b when viewed in the optical axis direction.

The focus motor 64 is disposed at a position that does not overlap the zoom motor 87, the transmission mechanism 84, the lens-side contact unit 91, the electrical board 92, the aperture drive motor 62a, the correction drive unit 46, the focusing main shaft 58, the focusing sub-shaft 59, or the restricting shaft 49b when viewed in the optical axis direction.

The lens-side contact unit 91 is disposed at a position that does not overlap the zoom motor 87, the transmission mechanism 84, the focus motor 64, the focusing main shaft 58, the focusing sub-shaft 59, or the restricting shaft 49b when viewed in the optical axis direction. To put this the other way, at least part of the lens-side contact unit 91 overlaps the electrical board 92, the aperture drive motor 62a and the correction drive unit 46 when viewed in the optical axis direction.

The electrical board 92 is disposed at a position that does not overlap the zoom motor 87, the transmission mechanism 84, the focus motor 64, the focusing main shaft 58, or the focusing sub-shaft 59 when viewed in the optical axis direction. To put this the other way, at least part of the electrical board 92 overlaps the lens-side contact unit 91, the aperture drive motor 62a, the correction drive unit 46, and the restricting shaft 49b when viewed in the optical axis direction.

The aperture drive motor 62a is disposed at a position that does not overlap the zoom motor 87, the transmission mechanism 84, the focus motor 64, the correction drive unit 46, the focusing main shaft 58, the focusing sub-shaft 59, or the restricting shaft 49b when viewed in the optical axis direction. To put this the other way, at least part of the aperture drive motor 62a overlaps the lens-side contact unit 91 and the electrical board 92 when viewed in the optical axis direction.

The correction drive unit 46 is disposed at a position that does not overlap the zoom motor 87, the transmission mechanism 84, the focus motor 64, the aperture drive motor 62a, the focusing main shaft 58, the focusing sub-shaft 59, or the restricting shaft 49b when viewed in the optical axis direction. To put this the other way, at least part of the correction drive unit 46 overlaps the lens-side contact unit 91 and the electrical board 92 when viewed in the optical axis direction.

The focusing main shaft 58 and the focusing sub-shaft 59 are disposed at positions that do not overlap the zoom motor 87, the transmission mechanism 84, the focus motor 64, the lens-side contact unit 91, the electrical board 92, the aperture drive motor 62a, the correction drive unit 46, or the restricting shaft 49b when viewed in the optical axis direction.

The restricting shaft 49b is disposed at a position that does not overlap the zoom motor 87, the transmission mechanism 84, the focus motor 64, the lens-side contact unit 91, the aperture drive motor 62a, the correction drive unit 46, the focusing main shaft 58, or the focusing sub-shaft 59 when viewed in the optical axis direction. To put this the other way, restricting shaft 49b overlaps the electrical board 92 when viewed in the optical axis direction.

As described above, the interchangeable lens unit 2 can be made more compact (and thinner in particular) by dispersively arranging several of the constituent members included in the interchangeable lens unit 2 over a plane.

Also, the aperture drive motor 62a is disposed at a position that does not overlap the correction drive unit 46 (discussed below) when viewed in the optical axis direction. Therefore, any magnetic flux that leaks from the correction drive unit 46 will have less effect on the aperture drive motor 62a, so the operation of the aperture unit 62 can be stabilized while the interchangeable lens unit 2 is configured to be made more compact.

The phrase "when viewed in the optical axis direction" means "when viewed in a direction parallel to the optical axis in a state in which other members have been removed so that at least members whose positional relation is to be compared can be seen." Therefore, regardless of whether or not the various members can be seen from the outside of the interchangeable lens unit 2, the above-mentioned positional relations may be determined by taking out just the members to be compared.

Camera Body 3

The simplified configuration of the camera body 3 will be described through reference to FIGS. 1 to 3A and 3B. As shown in FIGS. 1 to 3A and 3B, the camera body 3 has a housing 3a, the body mount 4, an interface unit 39, an image acquisition component 35, an image display component 36, a viewfinder component 38, a body controller 10, and a battery 22. The camera body 3 does not have a quick-return mirror installed between the body mount 4 and the imaging sensor 11.

(1) Housing 3a

Figure 3A:
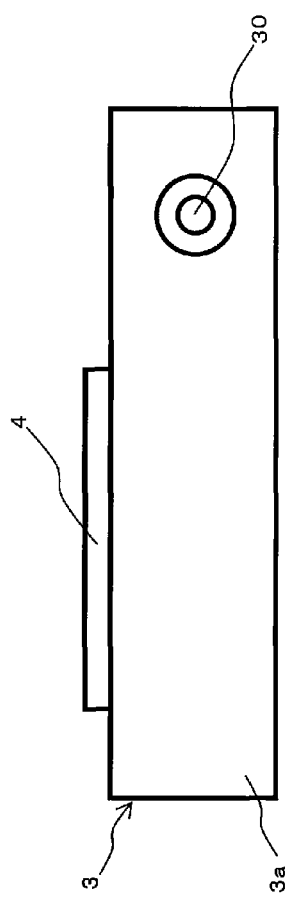
FIG. 3A is a top view of the camera body 3.
Figure 3B:
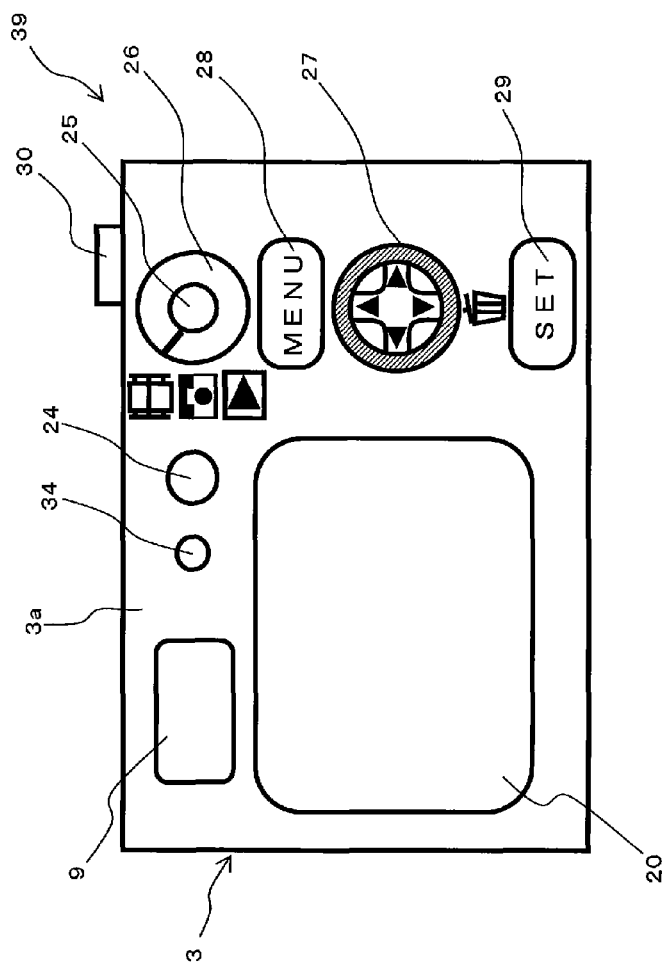
FIG. 3B is a rear view of the camera body 3.
Figure 4:
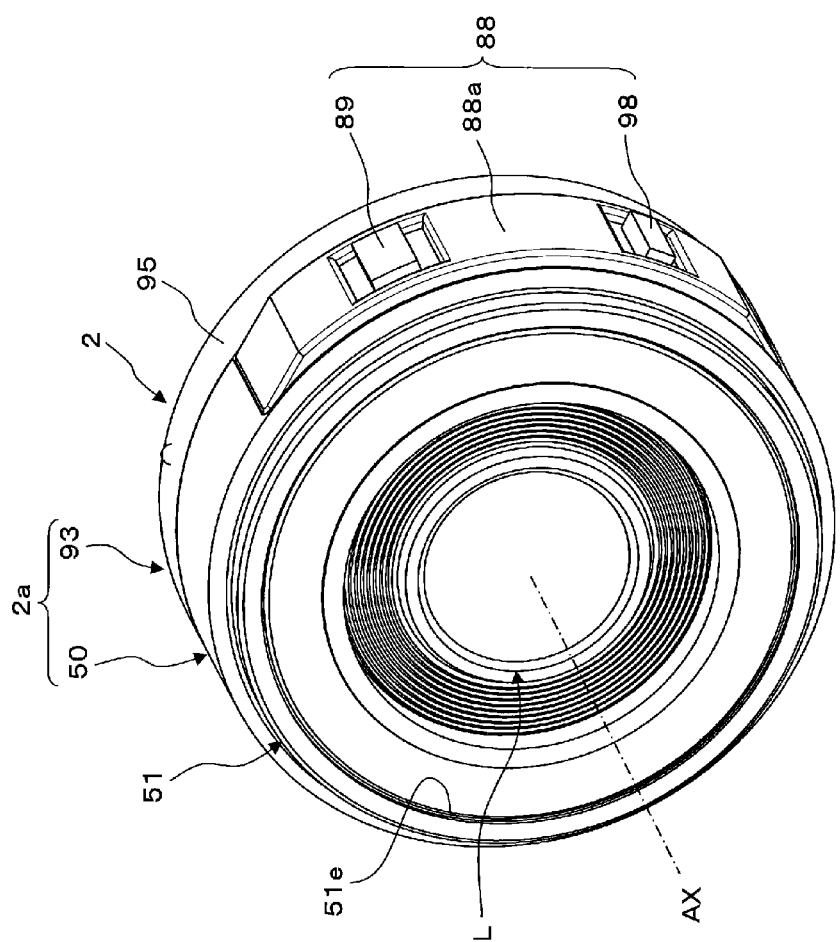
FIG. 4 is an oblique perspective view of an interchangeable lens unit 2.

The housing 3a constitutes the outer shell of the camera body 3. As shown in FIGS. 3A and 3B, the body mount 4 is provided to the front face of the housing 3a. The interface unit 39 is provided to the rear and top faces of the housing 3a. More specifically, the rear face of the housing 3a is provided with a display component 20, a power switch 25, a mode selector dial 26, a cross key 27, a menu setting button 28, a set button 29, an imaging mode button 34, and a moving picture imaging button 24. The top face of the housing 3a is provided with a shutter button 30.

(2) Body Mount 4

The lens mount 95 of the interchangeable lens unit 2 is mounted to the body mount 4. The body mount 4 has a bayonet (not shown) that engages with the bayonet 95a of the lens mount 95. Also, the body mount 4 has a body-side contact unit (not shown). In a state in which the lens mount 95 has been mounted to the body mount 4, the contacts of the lens-side contact unit 91 are in contact with the contacts of the body-side contact unit. In this state, the camera body 3 is able to send and receive data to and from the interchangeable lens unit 2 via the body mount 4 and the lens mount 95. For instance, the body controller 10 (discussed below) sends a control signal such as an exposure synchronization signal through the body mount 4 and the lens mount 95 to the lens controller 40.

(3) Interface Unit 39

As shown in FIGS. 3A and 3B, the interface unit 39 has various interface members that allow the user to input operation information. For example, the power switch 25 is used to turn on and off the power to the digital camera 1 or the camera body 3. When the power switch 25 is switched on, power is supplied to the various components of the camera body 3 and the interchangeable lens unit 2.

The mode selector dial 26 is used to switch the operating mode between a still picture imaging mode, a moving picture imaging mode, a reproduction mode, and so forth. The user turns the mode selector dial 26 to switch the operating mode of the digital camera 1. When the still picture imaging mode is selected with the mode selector dial 26, the operating mode is switched to the still picture imaging mode. When the moving picture imaging mode is selected with the mode selector dial 26, the operating mode is switched to the moving picture imaging mode. In the moving picture imaging mode, basically moving picture imaging is possible. When the reproduction mode is selected with the mode selector dial 26, the operating mode is switched to the reproduction mode, allowing the captured image to be displayed on the display component 20.

The cross key 27 is used to select the left, right, up, and down directions. The cross key 27 can be used to select the desired menu from various menu screens displayed on the display component 20, for example.

The menu setting button 28 is used for setting the various operations of the digital camera 1. The set button 29 is used for executing the operations of the various menus.

The moving picture imaging button 24 is used for starting and stopping the capture of moving pictures. Regardless of the setting of the mode selector dial 26, when the moving picture imaging button 24 is pressed, the operating mode is forcibly changed to the moving picture imaging mode and moving picture imaging begins. When this moving picture imaging button 24 is pressed during the capture of a moving picture, the moving picture imaging ends and the operating mode is switched to the one selected on the mode selector dial 26. For example, if the still picture imaging mode has been selected with the mode selector dial 26 when the moving picture imaging button 24 is pressed, the operating mode is automatically switched to the still picture imaging mode after the moving picture imaging button 24 is pressed again.

The shutter button 30 is pressed by the user to capture an image. When the shutter button 30 is pressed, a timing signal is outputted to a body controller 10. The shutter button 30 is a two-stage switch that can be pressed half-way down or all the way down. Light metering and ranging are commenced when the user presses the button half-way down. When the user presses the shutter button 30 all the way down in a state in which the shutter button 30 has been pressed half-way down, a timing signal is outputted, and image data is acquired by the image acquisition component 35.

(4) Image Acquisition Component 35

The image acquisition component 35 mainly has a CCD (charge coupled device) or other such imaging sensor 11 (an example of an imaging element) that performs opto-electric conversion, a shutter unit 33 that adjusts the exposure state of the imaging sensor 11, a shutter controller 31 that controls the drive of the shutter unit 33 on the basis of a control signal from the body controller 10, and an imaging sensor drive control component 12 that controls the operation of the imaging sensor 11.

The imaging sensor 11 converts the optical image formed by the optical system O into image data. The imaging sensor 11 can be, for example, a CCD (charge coupled device) or a CMOS (complementary metal oxide semiconductor) sensor. The imaging sensor 11 outputs image data on the basis of a timing signal generated by the imaging sensor drive control component 12.

The shutter controller 31 controls a shutter drive motor 32 on the basis of a control signal sent from the body controller 10. For example, the shutter unit 33 is charged by the shutter drive motor 32.

The auto-focus method that is employed in this embodiment is a contrast detection method. The use of a contrast detection method affords high-precision focal adjustment. However, some other method (such as a phase difference detection method) may be used instead as the auto-focus method.

(5) Body Controller

The body controller 10 controls the various components of the digital camera 1. More specifically, the body controller 10 is equipped with a CPU (not shown), a ROM (not shown), and a RAM (not shown). The programs held in the ROM are executed by the CPU, allowing the body controller 10 to perform a variety of functions. For instance, the body controller 10 has the function of detecting that the interchangeable lens unit 2 has been mounted to the camera body 3, or the function of acquiring from the interchangeable lens unit 2 any focal distance information or other such information that is necessary for controlling the digital camera 1.

The body controller 10 is able to receive signals from the power switch 25, the shutter button 30, the mode selector dial 26, the cross key 27, the menu setting button 28, and the set button 29. Various information related to the camera body 3 is held in a memory 10a inside the body controller 10. The memory 10a is a nonvolatile memory, and is capable of holding stored information even when the power supply has been halted.

Also, the body controller 10 periodically produces a vertical synchronization signal, and produces an exposure synchronization signal on the basis of the vertical synchronization signal and in parallel with the production of the vertical synchronization signal. The body controller 10 can produce an exposure synchronization signal because the exposure start timing and the exposure stop timing based on the vertical synchronization signal have been ascertained beforehand. The body controller 10 outputs a vertical synchronization signal to a timing generator (not shown), and outputs an exposure synchronization signal at a specific period to the lens controller 40 via the body mount 4 and the lens mount 95. The lens controller 40 acquires position information about the focus lens unit 75 in synchronization with the exposure synchronization signal.

The imaging sensor drive control component 12 produces an electronic shutter drive signal and a read signal of the imaging sensor 11 at a specific period on the basis of the vertical synchronization signal. The imaging sensor drive control component 12 drives the imaging sensor 11 on the basis of the electronic shutter drive signal and the read signal. That is, the imaging sensor 11 reads to a vertical transfer component (not shown) the image data produced by numerous opto-electrical conversion elements (not shown) had by the imaging sensor 11, according to the read signal.

The body controller 10 also controls the focus adjusting unit 72 via the lens controller 40.

The image data outputted from the imaging sensor 11 is sent from an analog signal processing component 13 and successively processed by an A/D converting component 14, a digital signal processing component 15, a buffer memory 16, and an image compressing component 17. The analog signal processing component 13 subjects the image data outputted from the imaging sensor 11 to gamma processing or other such analog signal processing. The A/D converting component 14 converts the analog signal outputted from the analog signal processing component 13 into a digital signal.

The digital signal processing component 15 subjects the image data converted into a digital signal by the A/D converting component 14 to digital signal processing such as noise elimination or contour enhancement. The buffer memory 16 is a RAM (Random Access Memory), and temporarily stores the image data. The image data stored in the buffer memory 16 is sent to and processed by first the image compressing component 17 and then an image recording component 18. The image data stored in the buffer memory 16 is read at a command from an image recording control component 19 and sent to the image compressing component 17. The image data sent to the image compressing component 17 is compressed according to a command from the image recording control component 19. This compression adjusts the image data to a smaller data size than that of the original data. An example of the method for compressing the image data is the JPEG (Joint Photographic Experts Group) method in which compression is performed on each frame of image data. After this, the compressed image data is recorded by the image recording control component 19 to the image recording component 18. When a moving picture is recorded, JPEG can be used to compress a plurality of sets of image data, in which the image data is compressed the image data for each frame. Alternatively, an H.264/AVC method can also be used, in which compression is performed on image data for a plurality of frames all at once.

The image recording component 18 produces a still picture file or moving picture file that is associated with specific information to be recorded with the image data, on the basis of a command from the image recording control component 19. The image recording component 18 then records the still picture file or moving picture file on the basis of a command from the image recording control component 19. The image recording component 18 is a removable memory and/or an internal memory, for example. The specific information to be recorded along with the image data includes the date and time the image was captured, focal distance information, shutter speed information, aperture value information, and imaging mode information. Still picture files are in Exif® format or a format similar to Exif® format, for example. Moving picture files are in H.264/AVC format or a format similar to H.264/AVC format, for example.

(6) Image Display Component

The image display component 36 has the display component 20 and an image display control component 21. The display component 20 is a liquid crystal monitor, for example. The display component 20 displays the image data recorded to the image recording component 18 or the buffer memory 16 as a visible image on the basis of a command from the image display control component 21. Possible display modes with the display component 20 are a display mode in which just the image data is displayed as a visible image, and a display mode in which the image data and information about the time of image capture are displayed as visible images.

(7) Viewfinder Component

The viewfinder component 38 has a liquid crystal viewfinder 8 that displays images acquired by the imaging sensor 11, and a viewfinder eyepiece window 9 provided to the rear face of the housing 3a. The user can see the image displayed on the liquid crystal viewfinder 8 by looking through the viewfinder eyepiece window 9.

(8) Battery

The battery 22 supplies electrical power to the various components of the camera body 3, and also supplies power to the interchangeable lens unit 2 via the lens mount 95. In this embodiment, the battery 22 is a rechargeable cell. The battery 22 may also be a dry cell, or may be an external power supply with which power is supplied from the outside through a power cord.

Operation of Digital Camera

The operation of the digital camera 1 will now be described.

(1) Imaging Mode

This digital camera 1 has two imaging modes. More specifically, the digital camera 1 has a viewfinder imaging mode in which the user looks at the subject through the viewfinder eyepiece window 9, and a monitor imaging mode in which the user looks at the subject on the display component 20.

In viewfinder imaging mode, the image display control component 21 drives the liquid crystal viewfinder 8, for example. As a result, an image of the subject (a so-called through-image) acquired by the imaging sensor 11 is displayed in the liquid crystal viewfinder 8.

In monitor imaging mode, the image display control component 21 drives the display component 20, for example, and a real-time image of the subject is displayed on the display component 20. Switching between these two imaging modes is configured to be accomplished with the imaging mode button 34.

(2) Still Picture Imaging

When the user presses the shutter button 30 all the way down, a command is sent from the body controller 10 to the lens controller 40 so that the aperture value of the optical system O will be set to the aperture value calculated on the basis of the light metering output of the imaging sensor 11. The aperture drive control component 42 is then controlled by the lens controller 40, and the aperture unit 62 is stopped down to the indicated aperture value. Simultaneously with the aperture value indication, a drive command is sent from the imaging sensor drive control component 12 to the imaging sensor 11, and a command to drive the shutter unit 33 is sent. The imaging sensor 11 is exposed by the shutter unit 33 for the length of time of the shutter speed calculated on the basis of the light metering output from the imaging sensor 19.

When image capture processing has been executed and imaging is finished, the body controller 10 sends a control signal to the image recording control component 19. The image recording component 18 records image data to an internal memory and/or a removable memory on the basis of a command from the image recording control component 19. The image recording component 18 records imaging mode information (whether auto-focus imaging mode or manual focus imaging mode) along with image data to an internal memory and/or a removable memory on the basis of the command from the image recording control component 19.

Upon completion of the exposure, the imaging sensor drive control component 12 reads the image data from the imaging sensor 11, and after specific image processing, image data is outputted to the image display control component 21 via the body controller 10. Consequently, a captured image is displayed on the display component 20.

Also, upon completion of exposure, the shutter unit 33 is reset to its initial position by the body controller 10. Also, a command is issued from the body controller 10 to the lens controller 40, directing the aperture drive control component 42 to reset the aperture unit 62 to its open position, and reset commands are issued by the lens controller 40 to the various units. Upon completion of the resetting, the lens controller 40 notifies the body controller 10 of reset completion. The body controller 10 confirms that the shutter button 30 has not been pressed after the receipt of reset completion information from the lens controller 40 and after a series of processing following exposure has been completed, and ends the imaging sequence.

(3) Moving Picture Imaging

The digital camera 1 also has the function of capturing moving pictures. In moving picture imaging mode, image data is produced by the imaging sensor 11 at a specific period, and the image data thus produced is utilized to continuously carry out auto-focusing by contrast detection method. In moving picture imaging mode, a moving picture is recorded to the image recording component 18 when the shutter button 30 is pressed or when the moving picture imaging button 24 is pressed, and recording of the moving picture stops when the shutter button 30 or the moving picture imaging button 24 is pressed again.

Operation of Interchangeable Lens Unit 2

The operation of the interchangeable lens unit 2 will now be described.

(1) When Power is On

When the power switch 25 is switched on, power is supplied to the various components of the camera body 3 and the interchangeable lens unit 2. When power is supplied to the interchangeable lens unit 2, the interchangeable lens unit 2 is driven by the zoom motor 87 from its stowed state to its initial imaging state. More specifically, the zoom motor 87 is controlled by the lens controller 40 so that the cam frame 80 will rotate by a specific angle with respect to the fixed frame 50.

When the zoom driveshaft 87a of the zoom motor 87 rotates, the cam frame 80 rotates with respect to the fixed frame 50 via the first transmission gear 85, the second transmission gear 86, and the gear component 82.

When the cam frame 80 rotates with respect to the fixed frame 50, the guide cam followers 83 are guided by the guide cam grooves 50b. As a result, the cam frame 80 moves to the subject side while rotating with respect to the fixed frame 50.

Also, when the cam frame 80 rotates with respect to the fixed frame 50, the first lens support frame 51 moves along with the cam frame 80 in the optical axis direction. More specifically, since the rectilinear protrusions 51b are guided in the optical axis direction by the rectilinear grooves 50a, even though the cam frame 80 rotates with respect to the fixed frame 50, the first lens support frame 51 does not rotate with respect to the fixed frame 50. Therefore, as the cam frame 80 rotates, the inner peripheral cam followers 51d of the first lens support frame 51 are guided by the outer peripheral cam grooves 83b of the cam frame 80. As a result, the first lens support frame 51 moves to the subject side with respect to the cam frame 80. That is, the first lens support frame 51 is deployed from the fixed frame 50 to the subject side without rotating with respect to the fixed frame 50.

Furthermore, when the cam frame 80 rotates with respect to the fixed frame 50, the second lens support frame 69 moves along with the cam frame 80 in the optical axis direction. More specifically, since the rotation of the moving frame 53 with respect to the fixed frame 50 is restricted by the rectilinear guide plates 56a of the fourth lens support frame 56, the moving frame 53 does not rotate with respect to the fixed frame 50 even though the cam frame 80 does rotate with respect to the fixed frame 50. Therefore, as the cam frame 80 rotates, the cam followers 53e to 53g of the moving frame 53 are guided by the inner peripheral cam grooves 83a. At this point, since the cam followers 53e to 53g are guided by the region extending in the peripheral direction of the inner peripheral cam grooves 83a, the moving frame 53 does not move in the optical axis direction with respect to the cam frame 80. That is, the moving frame 53 moves to the subject side along with the cam frame 80 with respect to the fixed frame 50.

Figure 6B:
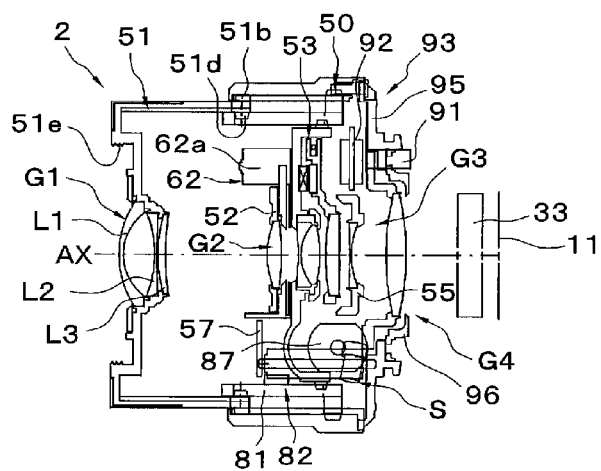
FIG. 6B is a simplified cross section of the interchangeable lens unit 2 at the wide angle end.

Thus, as shown in FIGS. 6B and 7B, the interchangeable lens unit 2 goes from its stowed state to its initial imaging state. In this embodiment, the optical system O is at the wide angle end when the interchangeable lens unit 2 is in its initial imaging state.

(2) During Zooming

The focal distance of the interchangeable lens unit 2 is adjustable between the wide angle end and the telephoto end by operating the zoom lever 89. More specifically, when the zoom lever 89 is operated to the telephoto side, the zoom lever detect component 90 detects this operation of the zoom lever 89, and the lens controller 40 controls the zoom motor 87 on the basis of the detection result of the zoom lever detect component 90.

Figure 6C:
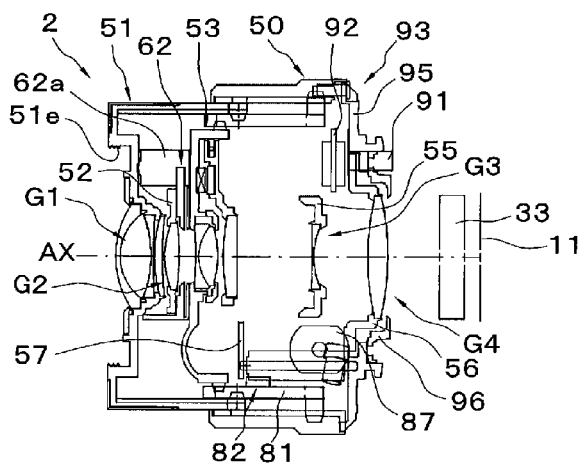
FIG. 6C is a simplified cross section of the interchangeable lens unit 2 at the telephoto end.

When the zoom driveshaft 87a of the zoom motor 87 rotates, the cam frame 80 rotates with respect to the fixed frame 50 via the transmission mechanism 84. The cam frame 80 rotates from the wide angle end to the telephoto end of the interchangeable lens unit 2 without moving in the optical axis direction with respect to the fixed frame 50. When the cam frame 80 rotates with respect to the fixed frame 50, the inner peripheral cam followers 51d are guided by the outer peripheral cam grooves 83b, and the first lens support frame 51 moves in the optical axis direction with respect to the fixed frame 50 according to the shape of the outer peripheral cam grooves 83b. In this embodiment, as shown in FIGS. 6C and 7C, the first lens support frame 51 moves to the image plane side with respect to the fixed frame 50, from the wide angle end to the telephoto end of the interchangeable lens unit 2.

Also, when the cam frame 80 rotates with respect to the fixed frame 50, the cam followers 53e to 53g of the moving frame 53 are guided by the inner peripheral cam grooves 83a, and the second lens support frame 69 moves in the optical axis direction with respect to the fixed frame 50 according to the shape of the inner peripheral cam grooves 83a. At this point, since the rotation of the moving frame 53 is restricted by the rectilinear guide plates 56a of the fourth lens support frame 56, the moving frame 53 moves in the optical axis direction without rotating with respect to the fixed frame 50. In this embodiment, as shown in FIGS. 6C and 7C, the second lens support frame 69 moves to the subject side with respect to the fixed frame 50, from the wide angle end to the telephoto end of the interchangeable lens unit 2.

When the second lens support frame 69 moves to the subject side, the cam frame 80 rotates with respect to the fixed frame 50. At this point, the gear component 82 of the cam frame 80 moves into the cut-out 53d in the moving frame 53, and the gear component 82 passes through the cut-out 53d. Therefore, even though the gear component 82 is formed on the inner peripheral face of the cam frame 80, a large amount of movement of the second lens support frame 69 in the optical axis direction can be ensured.

The focal distance of the interchangeable lens unit 2 thus changes to the telephoto side according to how long the zoom lever 89 is operated.

The operation of the interchangeable lens unit 2 when the zoom lever 89 is operated to the wide angle side is just the reverse of that when the zoom lever 89 is operated to the telephoto side, so it will not be described in detail here.

Features of Interchangeable Lens Unit 2

The features of the interchangeable lens unit 2 are compiled below.

(1) As shown in FIG. 8B, the gear component 82 is disposed at a substantially middle position of the main body 81 in the cam frame 80 in the optical axis direction, so a space is formed between the gear component 82 and the lens housing 2a in the optical axis direction. More specifically, as shown in FIGS. 6A to 6C, in a state in which the cam frame 80 is closest to the base member 93, a holding space S is ensured between the gear component 82 and the base member 93 in the optical axis direction. Therefore, this holding space S can be more effectively utilized than when the gear component 82 is formed at the end of the cam frame 80 on the lens housing 2a side. For example, since other constituent members can be disposed in this holding space S, the various members can be disposed more efficiently.

Furthermore, the member of the zoom drive unit 45 that meshes with the gear component 82 (that is, the first transmission gear 85) can be made smaller in the optical axis direction than when the gear component 82 is formed at the end of the cam frame 80 on the opposite side from the lens housing 2a.

Thus, with this interchangeable lens unit 2, the various members can be disposed more efficiently and the size of the unit can be reduced.

Figure 13:
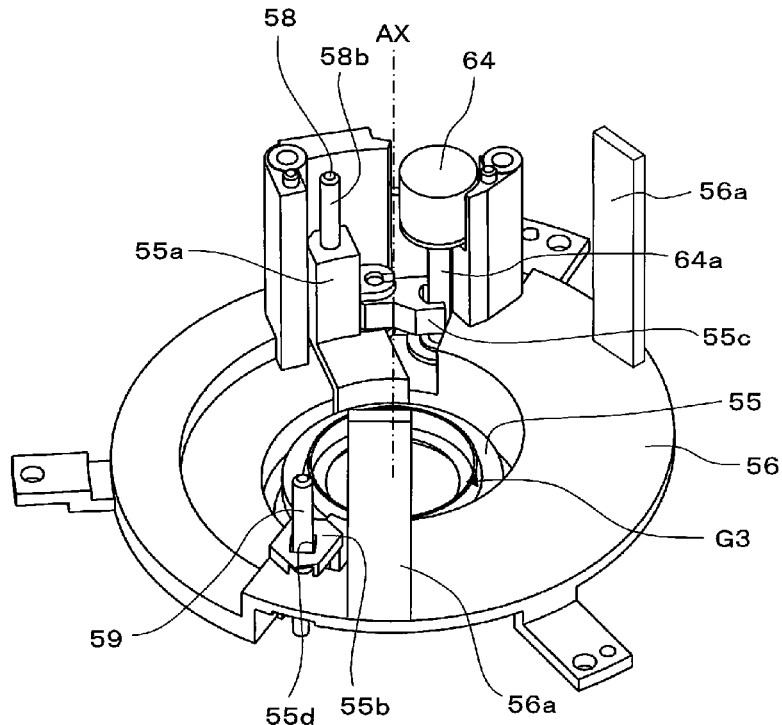
FIG. 13 is an oblique perspective view of a fourth lens support frame, a focus motor 64, and a third lens support frame 55.

(2) As shown in FIGS. 12B and 13A, the zoom motor 87 and the transmission mechanism 84 are disposed on the inner peripheral side of the cam frame 80, and the zoom motor 87 and the transmission mechanism 84 go into the holding space S. Here, the phrase "the zoom motor 87 goes into the holding space S" means that at least part of the zoom motor 87 is disposed between the gear component 82 and the base member 93 in the optical axis direction. Also, the phrase "the transmission mechanism 84 goes into the holding space S" means that at least part of the transmission mechanism 84 is disposed between the gear component 82 and the base member 93 in the optical axis direction.

(3) As shown in FIG. 6A, part of the moving frame 53 is disposed in the holding space S in a state in which the cam frame 80 is closest to the lens housing 2a in the optical axis direction. Therefore, with this interchangeable lens unit 2, so the holding space S can be utilized more effectively and the size of the unit can be further reduced.

Also, the gear component 82 of the cam frame 80 moves into the cut-out 53d while the moving frame 53 is being guided in the optical axis direction by the cam frame 80. Therefore, even though part of the moving frame 53 goes into the holding space S, the moving frame 53 is prevented from interfering with the cam frame 80, and a larger range of movement can be ensured for the moving frame 53.

Furthermore, since the second gear component 82b is disposed so as to move steadily from the first gear component toward the base member 93, when the moving frame 53 is guided by the cam frame 80 in the optical axis direction, the gear component 82 passes more easily through the cut-out 53d in the moving frame 53. Consequently, the length of the gear component 82 in the peripheral direction is able to be increased while a larger range of movement of the moving frame 53 is ensured.

(4) As shown in FIG. 8B, part of the inner peripheral cam grooves 83a of the cam frame 80 is disposed between the gear component 82 and the base member 93. Therefore, the space on the image plane side of the gear component 82 created by disposing the gear component 82 at a middle position in the optical axis direction can be effectively utilized.

(5) As shown in FIG. 9A, since the inside radius R1 of the bottom face of the inner peripheral cam grooves 83a is greater than the root radius R2 of the gear component 82, even when the layout is such that the inner peripheral cam grooves 83a and the gear component 82 overlap, the shape of the inner peripheral cam grooves 83a can be ensured within the smallest required range. Therefore, even though the gear component 82 is provided to the inner peripheral face of the cam frame 80, the cam grooves will tend not to be subject to restrictions, so design latitude is compromised less.

Also, since the root radius R2 of the gear component 82 is less than the inside radius R3 of the main body 81, the first transmission gear 85 is prevented from interfering with the inner peripheral face of the main body component 81. Also, even if the outer peripheral cam groove 83b overlaps the gear component 82, it will still be easy to ensure the proper thickness of the cam frame 80, so there will be less decrease in the strength of the cam frame 80.

(6) As shown in FIG. 8A, the fixed components 50e of the base member 93 and the fixed frame 50 are disposed between the guide cam grooves 50b in the peripheral direction, so the fixed frame 50 can be shorter in the optical axis direction, and the interchangeable lens unit 2 can be made more compact.

(7) As shown in FIG. 8A, since the zoom lever 89 and the focus lever 98 are disposed at positions farther away from the base member 93 than the guide cam grooves 50b in the optical axis direction, when the various members are assembled on the fixed frame 50, they will not interfere with the zoom lever 89 and the focus lever 98. Therefore, even though the zoom lever 89 and the focus lever 98 are provided to the interchangeable lens unit 2, the interchangeable lens unit 2 is no more difficult to assemble.

Second Embodiment

In the first embodiment given above, the zoom lever 89 and the focus lever 98 are used to change the focal distance and adjust the focus. However, changing the focal distance may be accomplished using a zoom ring, and focusing may be accomplished using a focus ring. An interchangeable lens unit 302 pertaining to a second embodiment will now be described, using a zoom ring as an example.

Those components that have substantially the same function as those in the first embodiment above will be numbered the same and will not be described in detail again.

Figure 21:
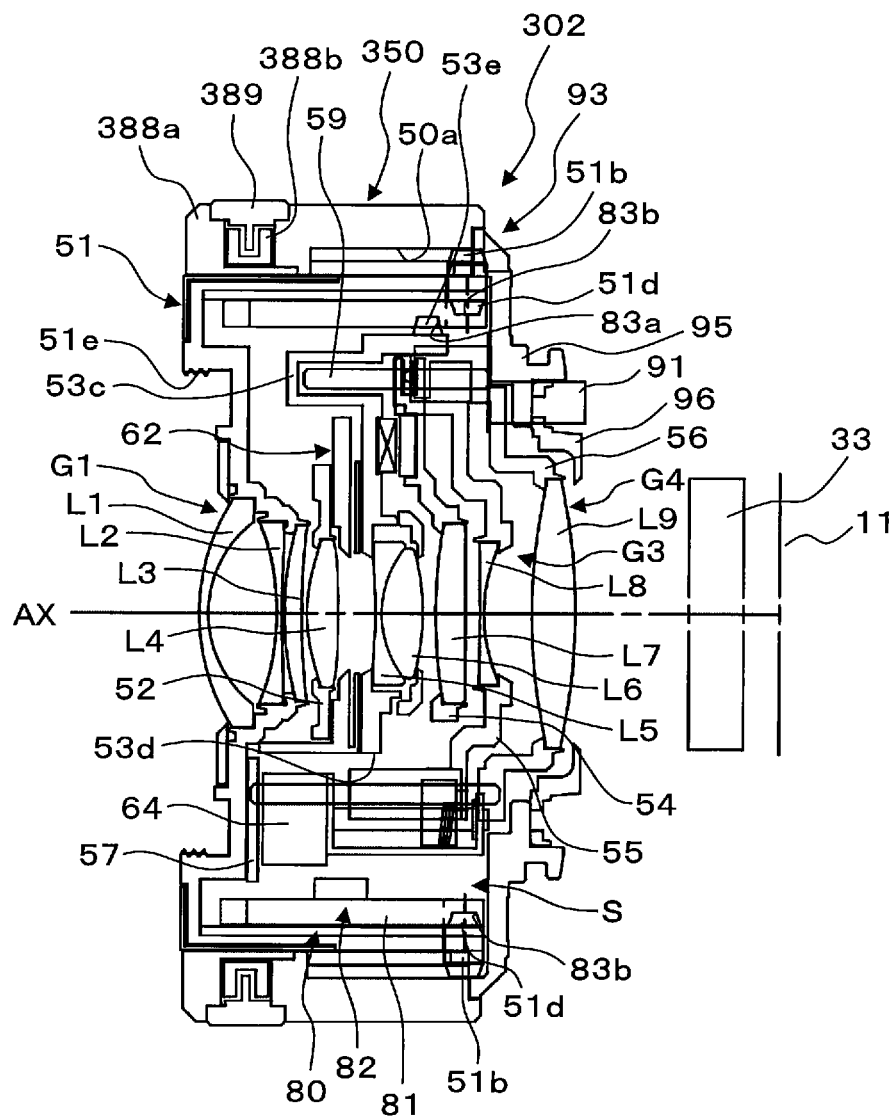
FIG. 21 is a simplified cross section of an interchangeable lens unit 302 in its stowed state.

The interchangeable lens unit 302 shown in FIG. 21 is equipped with a zoom ring unit 388. The zoom ring unit 388 has a stop ring 388a (an example of a restricting member) and a zoom ring 389 (an example of an interface member). In other words, the stop ring 388a is an annular member, and is mounted to the end of a fixed frame 350 on the subject side. The stop ring 388a is disposed on the opposite side of the fixed frame 350 from the base member 93. The zoom ring 389 is an annular member and is sandwiched between the fixed frame 350 and the stop ring 388a. The zoom ring 389 is rotatably supported by the fixed frame 350 and the stop ring 388a, and its movement in the optical axis direction is restricted with respect to the fixed frame 350.

Also, a rotation detector 388b is provided on the inner peripheral side of the zoom ring 389. The rotation detector 388b can detect the rotation direction and rotation angle of the zoom ring 389. This allows the lens controller 40 to ascertain the direction and amount in which the zoom ring 389 is operated. The zoom ring 389 is disposed more to the subject side than the zoom motor 87.

The focal distance can also be adjusted with this constitution.

The zoom ring 389 may be rotatably supported by the stop ring 388a and/or the fixed frame 350.

Other Embodiments

The technology disclosed herein is not limited to the embodiments given above, and various modifications and variations are possible without departing from the gist of the invention.

Those components that have substantially the same function as those in the first and second embodiments above will be numbered the same and will not be described in detail again.

(1) In the above embodiments, an imaging device was described by using the digital camera 1 as an example, but the imaging device is not limited to being the digital camera 1. For instance, the digital camera 1 can perform still picture imaging and moving picture imaging, but the imaging device may be one that performs only still picture imaging, or one that performs only moving picture imaging.

(2) In the above embodiments, a lens barrel was described using the interchangeable lens units 2 and 302 as an example, but the lens barrel is not limited to being the interchangeable lens unit 2 or 302. For example, the lens barrel may be one that is used in an imaging device that has an integrated construction, rather than employing an interchangeable lens unit.

(3) In the above embodiments, a first actuator is described using the zoom motor 87 as an example, but the first actuator is not limited to being the zoom motor 87. For example, the first actuator may be some motor other than one used for zoom adjustment. Also, the first actuator is not limited to being a DC motor, and may be some other type of motor (such as a stepping motor).

Also, a second actuator is described using the focus motor 64 as an example, but the second actuator is not limited to being the focus motor 64. For example, the second actuator may be some motor other than one used for focus adjustment. Also, the second actuator is not limited to being a stepping motor, and may be some other type of motor (such as a DC motor).

Furthermore, the first actuator may be an actuator other than a motor, such as a piezoelectric actuator. More specifically, as shown in FIG. 22A, a piezoelectric actuator 187 is mounted to the lens housing 2a (more precisely, the fourth lens support frame 56). The lengthwise direction L of the piezoelectric actuator 187 is different from the optical axis direction. More precisely, as shown in FIG. 22A, the lengthwise direction L of the piezoelectric actuator 187 is disposed substantially parallel to a plane that is perpendicular to the optical axis direction (that is, the paper plane in FIG. 22A), just as with the rotational axis E1 of the zoom motor 87.

The piezoelectric actuator 187 is in contact with a second transmission gear 186 of the transmission mechanism 84. The second transmission gear 186 corresponds to the above-mentioned second transmission gear 86. As shown in FIG. 22B, when voltage is applied to the piezoelectric actuator 187, the piezoelectric actuator 187 is displaced in the direction indicated by the arrow. This displacement of the piezoelectric actuator 187 imparts torque to the second transmission gear 186, causing the second transmission gear 186 to rotate around the rotational axis E3. As a result, the cam frame 80 rotates via the first transmission gear 85.

Also, the configuration shown in FIG. 22C is possible for the transmission mechanism 84 when the piezoelectric actuator 187 is used. More specifically, as shown in FIG. 22C, the member that is in contact with the piezoelectric actuator 187 may be a rotating member 286. The displacement of the piezoelectric actuator 187 imparts torque to the rotating member 286, causing the rotating member 286 to rotate. The rotation of the rotating member 286 is transmitted through an intermediate transmission gear 288 to the first transmission gear 85, and the cam frame 80 rotates as a result.

(4) In the above embodiments, a transmission mechanism is described using the transmission mechanism 84 as an example, but the transmission mechanism is not limited to being the transmission mechanism 84. As long as the transmission mechanism has a configuration in which drive force is transmitted from the driveshaft of a first actuator to a second frame, the transmission mechanism may have some other configuration. For instance, the transmission mechanism 84 may have a spur gear or another such member besides the first transmission gear 85 and the second transmission gear 86, or the structure of the transmission mechanism 84 may be simpler than the structure discussed above.

Also, a first transmission gear member is described using the first transmission gear 85 as an example, but the first transmission gear member is not limited to being the first transmission gear 85. For example, the lens barrel may be made more compact even if the rotational axis E2 of the first transmission gear 85 is not parallel to the optical axis direction.

Also, a second transmission gear member is described using the second transmission gear 86 as an example, but the second transmission gear member is not limited to being the second transmission gear 86. For example, the lens barrel may be made more compact even if the rotational axis E3 of the second transmission gear 86 is not parallel to the optical axis direction.

(5) The rotational axis E3 of the second transmission gear 86 is inclined by an angle of θ4, which is substantially the same as the lead angle of the second intermediate gear 86b, with respect to a plane that is perpendicular to the optical axis direction, but the rotational axis E3 of the second transmission gear 86 need not be inclined with respect to a plane that is perpendicular to the optical axis direction.

Also, the output gear 87b of the zoom motor 87 is disposed between the first intermediate gear 86a of the second transmission gear 86 and the base member 93, but the zoom motor 87 and the second transmission gear 86 are not limited to having this layout.

(6) In the above embodiments, the lengthwise direction of the first actuator is different from the optical axis direction, but the lengthwise direction of the first actuator may be the same as the optical axis direction. Also, the lengthwise direction of the first actuator is parallel to a plane that is perpendicular to the optical axis direction, but the lengthwise direction of the first actuator may be inclined with respect to a plane that is perpendicular to the optical axis direction.

(7) In the above embodiments, a first frame is described using the base member 93 as an example, but the first frame is not limited to being the base member 93. For example, the first frame may be constituted by a single member.

Also, in the above embodiments, a second frame is described using the cam frame 80 as an example, but the second frame is not limited to being the cam frame 80. For example, the cam frame 80 moved in the optical axis direction with respect to the base member 93, but the second frame may not move in the optical axis direction with respect to the first frame.

(8) In the above embodiments, the transmission mechanism 84 transmitted the rotation of the zoom driveshaft 87a to the gear component 82 of the cam frame 80 after first reducing its speed, but the transmission mechanism 84 may instead transmit the rotation of the zoom driveshaft 87a to the gear component 82 without reducing its speed.

(9) In the above embodiments, an interface member was described using the zoom lever 89, the focus lever 98, and the zoom ring 389 as examples, but the interface member may be a focus ring used in adjusting the focus.

(10) In the above embodiments, the zoom motor 87 is disposed at a position that does not overlap the lens-side contact unit 91 or the electrical board 92 when viewed in the optical axis direction, but as long as the interchangeable lens unit 2 is able to be made more compact, the zoom motor 87 may overlap the lens-side contact unit 91 and the electrical board 92 when viewed in the optical axis direction.

Also, the focus motor 64 is disposed at a position that does not overlap the lens-side contact unit 91 or the electrical board 92 when viewed in the optical axis direction, but as long as the interchangeable lens unit 2 is able to be made more compact, the focus motor 64 may overlap the lens-side contact unit 91 and the electrical board 92 when viewed in the optical axis direction.

(11) In the above embodiments, the rotational axis E4 of the focus driveshaft 64a of the focus motor 64 was parallel to the optical axis direction, but the rotational axis E4 of the focus driveshaft 64a may be inclined with respect to the optical axis direction.

Also, the focus driveshaft 64a has a lead screw, and the third lens support frame 55 has the rack 55c. However, the configuration for driving the third lens support frame 55 is not limited to this configuration.

(12) The zoom motor 87 is disposed at a position that does not overlap the correction drive unit 46 when viewed in the optical axis direction, but as long as the interchangeable lens unit 2 is able to be made more compact, the zoom motor 87 may overlap the correction drive unit 46 when viewed in the optical axis direction.

Also, the focus motor 64 is disposed at a position that does not overlap the correction drive unit 46 when viewed in the optical axis direction, but as long as the interchangeable lens unit 2 is able to be made more compact, the focus motor 64 may overlap the correction drive unit 46 when viewed in the optical axis direction.

(13) In the above embodiments, a guide member is described using the focusing main shaft 58 as an example, but the guide member is not limited to being the focusing main shaft 58. Also, a rotation restricting member is described using the focusing sub-shaft 59 as an example, but the rotation restricting member is not limited to being the focusing sub-shaft 59.

For example, the focusing main shaft 58 and the focusing sub-shaft 59 are disposed at a position that does not overlap the zoom motor 87 when viewed in the optical axis direction, but as long as the interchangeable lens unit 2 is able to be made more compact, the focusing main shaft 58 and the focusing sub-shaft 59 may overlap the zoom motor 87 when viewed in the optical axis direction.

Also, the focusing main shaft 58 and the focusing sub-shaft 59 are disposed at positions that does not overlap the focus motor 64 when viewed in the optical axis direction, but as long as the interchangeable lens unit 2 is able to be made more compact, the focusing main shaft 58 and the focusing sub-shaft 59 may overlap the focus motor 64 when viewed in the optical axis direction.

(14) In the above embodiments, a moving frame is described using the moving frame 53 as an example, but the moving frame is not limited to being the moving frame 53. For example, the moving frame 53 has the holder portion 53c, but as long as interference between the focusing sub-shaft 59 and the moving frame 53 is able to be avoided with another configuration, the moving frame 53 need not have the holder portion 53c.

Also, the above-mentioned holder portion 53c is a pouch-like cylindrical component that is closed at one end, but the holder portion 53c may instead be a simple cylindrical portion or a through-hole.

(15) In the above embodiments, the electrical board 92 is fixed to the fourth lens support frame 56, but the interchangeable lens unit 2 is also able to be made more compact if the electrical board 92 is instead fixed to the lens mount 95 or some other member.

Also, the zoom motor 87 is fixed to the fourth lens support frame 56, but the interchangeable lens unit 2 can also be made more compact if the zoom motor 87 is instead fixed to the lens mount 95 or some other member. Similarly, the transmission mechanism 84 is supported by the fourth lens support frame 56, but the interchangeable lens unit 2 is also able to be made more compact if the transmission mechanism 84 is instead supported by the lens mount 95 or some other member.

Furthermore, the focusing main shaft 58 is fixed to the fourth lens support frame 56, but the focusing main shaft 58 may instead be fixed to some other member.

(16) In the above embodiments, a shaft support member is described using the first support cover 57 as an example, but the shaft support member is not limited to being the first support cover 57. The interchangeable lens unit 2 is also able to be made more compact if the first support cover 57 has some other shape instead.

(17) The zoom motor 87 is disposed at a position that does not overlap the aperture drive motor 62a when viewed in the optical axis direction, but as long as the interchangeable lens unit 2 is able to be made more compact, the zoom motor 87 may overlap the aperture drive motor 62a when viewed in the optical axis direction.

Also, the focus motor 64 is disposed at a position that does not overlap the aperture drive motor 62a when viewed in the optical axis direction, but as long as the interchangeable lens unit 2 is able to be made more compact, the focus motor 64 may overlap the aperture drive motor 62a when viewed in the optical axis direction.

(18) The restricting shaft 49b, which is an example of a restricting shaft, is disposed at a position that does not overlap the aperture unit 62 when viewed in the optical axis direction, but as long as the interchangeable lens unit 2 is able to be made more compact, the restricting shaft 49b may overlap the aperture unit 62 when viewed in the optical axis direction.

(19) The cam follower 53e, which is an example of a first cam follower, is disposed on the outer peripheral side of the zoom motor 87 when viewed in the optical axis direction, but the interchangeable lens unit 2 is also able to be made more compact if the cam follower 53e is not disposed on the outer peripheral side of the zoom motor 87 when viewed in the optical axis direction.

Also, the focus motor 64 is disposed between the cam follower 53e and the cam follower 53f in the peripheral direction when viewed in the optical axis direction, but the interchangeable lens unit 2 is also able to be made more compact if the focus motor 64 is not disposed between the cam follower 53e and the cam follower 53f in the peripheral direction when viewed in the optical axis direction.

Furthermore, in the above embodiments, the central angle θ1 between the cam follower 53e and the cam follower 53f is greater than the central angle θ2 between the cam follower 53e and the cam follower 53g, and is greater than the central angle θ3 between the cam follower 53f and the cam follower 53g. However, the interchangeable lens unit 2 is also able to be made more compact if the central angle θ1 is not greater than the central angles θ2 or θ3, such as when the central angles θ1 to θ3 are the same.

(20) The moving frame 53 has the cut-out 53d formed between the cam followers 53e and 53f, and the focus motor 64 is disposed in the cut-out 53d when viewed in the optical axis direction, but the focus motor 64 need not be disposed in the cut-out 53d, and some other member may instead be disposed in the cut-out 53d.

Also, the gear component 82 of the cam frame 80 is configured to pass through the cut-out 53*d* while the moving frame 53 is being guided in the optical axis direction by the cam frame 80, but the interchangeable lens unit 2 is also able to be made more compact if the outer size of the moving frame 53 is made smaller so as to avoid the gear component 82.

(21) The rotational axis E1 of the zoom driveshaft 87*a* of the zoom motor 87 is disposed substantially in the peripheral direction of the cam frame 80, but the zoom motor 87 is not limited to having this layout. For example, the interchangeable lens unit 2 is also able to be made more compact if the rotational axis E1 of the zoom driveshaft 87*a* is not disposed in the peripheral direction of the cam frame 80.

(22) In the above embodiments, the gear component of a first frame is described using the gear component 82 of the cam frame 80 as an example, but the gear component is not limited to being the gear component 82. For example, the gear component 82 has the first gear component 82*a* and the second gear component 82*b*, but, for example the gear component 82 may instead have just the first gear component 82*a*, or just the second gear component 82*b*. Furthermore, the gear component 82 may have a portion other than the first gear component 82*a* and the second gear component 82*b*.

Also, the position of the gear component 82 in the optical axis direction is not limited to that in the above embodiments. As long as the interchangeable lens unit 2 is able to be made more compact, the gear component 82 may be offset somewhat toward the image plane side or the subject side from the middle position of the main body 81 in the optical axis direction.

(23) In the above embodiments, a drive actuator is described using the zoom drive unit 45 as an example, but the drive actuator is not limited to being the zoom drive unit 45. The drive actuator may have some other configuration, as long as it rotationally drives the second frame with respect to the first frame.

(24) In the above embodiments, the zoom motor 87 and the transmission mechanism 84 go into the stowage space S, but as long as the stowage space S is effectively utilized in some way, and as a result the interchangeable lens unit 2 is able to be made more compact, the zoom motor 87 and the transmission mechanism 84 need not go into the stowage space S.

(25) In the above embodiments, part of the moving frame 53 goes into the stowage space S in the stowed state in which the cam frame 80 is closest to the base member 93 in the optical axis direction, but as long as the stowage space S is effectively utilized in some way, and as a result the interchangeable lens unit 2 is also able to be made more compact, the part of the moving frame 53 need not go into the stowage space S.

(26) Part of one of the three inner peripheral cam grooves 83*a* is disposed between the gear component 82 and the base member 93, but as long as the interchangeable lens unit 2 is able to be more compact, the cam groove need not be disposed between the gear component 82 and the base member 93. Conversely, all of one of the inner peripheral cam grooves 83*a* may be disposed between the gear component 82 and the base member 93, or at least part of another inner peripheral cam groove 83*a* may be disposed between the gear component 82 and the base member 93.

(27) In the above embodiments, the electrical board 92 is disposed on the inner peripheral side of the cam frame 80 when viewed in the optical axis direction, but as long as the interchangeable lens unit 2 is able to be made more compact, the electrical board 92 need not be disposed on the inner peripheral side of the cam frame 80 when viewed in the optical axis direction. For example, part of the electrical board 92 may overlap the cam frame 80 when viewed in the optical axis direction.

(28) In the above embodiments, the first coil 46*a* and the second coil 46*b* are fixed on the image plane side of the moving frame 53, but may instead be fixed on the image plane side of the aperture unit 62. In this case, for example, the first coil 46*a* and the second coil 46*b* are configured to be disposed close to the first magnet 54*a* and the second magnet 54*b*, respectively, by cutting out the region of the moving frame 53 that overlaps the first coil 46*a* and the second coil 46*b* in the optical axis direction, allowing an electromagnetic actuator to be constituted.

INDUSTRIAL APPLICABILITY

The lens barrel described above is configured to be made more compact, and is therefore useful in the field of imaging devices.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel and the imaging device equipped with the lens barrel. Accordingly, these terms, as utilized to describe the technology disclosed herein should be interpreted relative to the lens barrel and the imaging device equipped with the lens barrel.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A lens barrel, comprising:
a first frame;
a second frame rotatably supported by the first frame;
a moving frame guided in the optical axis direction by the second frame; and
a drive actuator that is mounted on the first frame and rotationally drives the second frame with respect to the first frame,
wherein the second frame has a substantially cylindrical main body component and a gear component that is disposed on the inner peripheral face of the main body component and to which the drive force of the drive actuator is transmitted, and
the gear component is disposed substantially in the middle of the main body component in the optical axis direction.

2. The lens barrel according to claim 1, wherein
the gear component protrudes inward from the inner peripheral face of the main body component.

3. The lens barrel according to claim 1, wherein
the first frame has a substantially cylindrical outer frame that rotatably supports the second frame, and a base member that is fixed to the end of the outer frame, and
a holding space is left between the gear component and the base member in the optical axis direction.

4. The lens barrel according to claim 3, wherein
the drive actuator has a first actuator that is fixed to the first frame and generates drive force, and a transmission mechanism that transmits the drive force of the first actuator to the gear component,
the first actuator and the transmission mechanism are disposed on an inner peripheral side of the second frame, and
at least one of the first actuator and the transmission mechanism goes inside the holding space.

5. The lens barrel according to claim 4, wherein
the first actuator has a driveshaft that outputs drive force, and
the rotational axis of the driveshaft faces in a different direction from the optical axis direction.

6. The lens barrel according to claim 3, wherein
a part of the moving frame goes into the holding space in a state in which the moving frame is closest to the first frame in the optical axis direction.

7. The lens barrel according to claim 6, wherein
the second frame has a first cam groove formed in the inner peripheral face of the main body component, a second cam groove formed in the inner peripheral face of the main body component, and a third cam groove formed in the inner peripheral face of the main body component,
the moving frame has a first cam follower guided by the first cam groove, a second cam follower guided by the second cam groove, and a third cam follower guided by the third cam groove, and
at least part of the first cam groove is disposed between the gear component and the base member.

8. The lens barrel according to claim 7, wherein
an inside radius of each of the bottom faces of the first to third cam grooves is greater than a root radius of the gear component.

9. The lens barrel according to claim 1, further comprising
an electrical contact that is fixed to the first frame and is electrically connectable to an external device; and
an electrical board that is fixed to the first frame and is electrically connected to the electrical contact,
wherein the electrical board is disposed on the inner peripheral side of the second frame when viewed in the optical axis direction.

10. The lens barrel according to claim 1, further comprising
a first lens frame that is supported movably in the optical axis direction by the first frame and whose rotation is restricted by the first frame; and
a first lens group that is fixed to the first lens frame,
wherein the first lens frame is driven in the optical axis direction by the second frame when the second frame rotates with respect to the first frame.

11. The lens barrel according to claim 1, wherein
a root radius of the gear component is smaller than an inside radius of the main body component.

12. The lens barrel according to claim 1, wherein
the second frame is guided in the optical axis direction by the first frame.

13. The lens barrel according to claim 3, wherein
the outer frame has a plurality of guide cam grooves,
the second frame has a plurality of guide cam followers respectively inserted into the plurality of guide cam grooves, and
the fixed parts of the base member and the outer frame are disposed between the guide cam grooves in the peripheral direction.

14. The lens barrel according to claim 13, further comprising
a manipulation member that is disposed on the outer peripheral part of the outer frame and is provided rotatably in the peripheral direction with respect to the first frame,
wherein the manipulation member is disposed at a location that does not overlap the plurality of guide cam grooves.

15. The lens barrel according to claim 14, further comprising
a restricting member that is disposed on the opposite side of the outer frame from the base member and is mounted to the end of the outer frame,
wherein the manipulation member is rotatably supported and its movement in the optical axis direction is restricted by at least one of the outer frame and the restricting member.

16. The lens barrel according to claim 4, wherein
the manipulation member is disposed closer to a subject side than the first actuator in the optical axis direction.

17. The lens barrel according to claim 1,
wherein at least one of the first lens frame and the moving frame, when not in use, move closer to an image plane side than its movement region in the optical axis direction when in use, with respect to the first frame.

18. The lens barrel according to claim 9, wherein
the second frame is allowed to overlap the electrical board when viewed in a direction perpendicular to the optical axis direction.

19. The lens barrel according to claim 10, wherein
the second frame has a plurality of inner peripheral cam grooves formed in its inner peripheral face,
a root radius of the gear component is smaller than an inside radii of each of the bottom faces of the plurality of inner peripheral cam grooves.

20. The lens barrel according to claim 14, wherein
the manipulation member has a portion which is closer to the optical axis than a plurality of bottom faces corresponding to the plurality of guide cam grooves.

* * * * *